US012711639B2

(12) United States Patent
Mukasa et al.

(10) Patent No.: US 12,711,639 B2
(45) Date of Patent: Aug. 18, 2026

(54) INFORMATION PROCESSING SYSTEM, METHOD AND PROGRAM

(71) Applicant: Rakuten Group, Inc., Tokyo (JP)

(72) Inventors: Tomoyuki Mukasa, Tokyo (JP); Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/013,173

(22) PCT Filed: Dec. 27, 2021

(86) PCT No.: PCT/JP2021/048571
§ 371 (c)(1),
(2) Date: Dec. 27, 2022

(87) PCT Pub. No.: WO2023/127020
PCT Pub. Date: Jul. 6, 2023

(65) Prior Publication Data

US 2024/0104754 A1 Mar. 28, 2024

(51) Int. Cl.
*G06T 7/37* (2017.01)
*G06T 3/60* (2024.01)
(Continued)

(52) U.S. Cl.
CPC .................. *G06T 7/37* (2017.01); *G06T 3/60* (2013.01); *G06T 7/32* (2017.01); *G06T 7/337* (2017.01);
(Continued)

(58) Field of Classification Search
CPC .... G06T 7/37; G06T 3/60; G06T 7/32; G06T 7/337; G06T 7/38; G06T 7/55;
(Continued)

(56) References Cited

U.S. PATENT DOCUMENTS 11,189,375 B1 11/2021 O'Connor et al.
2010/0295855 A1 11/2010 Sasakawa et al.
(Continued)

FOREIGN PATENT DOCUMENTS

CN 109443359 A 3/2019
CN 110910349 A 3/2020
(Continued)

OTHER PUBLICATIONS

Jingru Yi et al., "Oriented Object Detection in Aerial Images with Box Boundary-Aware Vectors", WACV, 2021, Department of Computer Science, Rutgers University, pp. 2150-2159 (10 pages).
(Continued)

*Primary Examiner* — Chan S Park
*Assistant Examiner* — Daniel C Chang
(74) *Attorney, Agent, or Firm* — Sughrue Mion, PLLC

(57) ABSTRACT

[Problem] The present disclosure has an object of correcting the orientation of a captured image captured during flight. [Solving Means] An information processing system includes: a captured image acquisition unit that acquires a captured image captured during flight by an imaging device mounted on an airplane; a relevant information acquisition unit that acquires information detected using a sensor mounted on the airplane; and an image correction unit that acquires, by correcting the captured image on a basis of information acquired using the relevant information, a correction image in which a predetermined direction in a state where the image is erected and a reference direction in the image are matched to each other.

12 Claims, 17 Drawing Sheets

(51) Int. Cl.

| | |
|---|---|
| ***G06T 7/32*** | (2017.01) |
| ***G06T 7/33*** | (2017.01) |
| ***G06T 7/38*** | (2017.01) |
| ***G06T 7/55*** | (2017.01) |
| ***G06T 7/80*** | (2017.01) |

(52) U.S. Cl.
CPC .................. *G06T 7/38* (2017.01); *G06T 7/55* (2017.01); *G06T 7/80* (2017.01); *G06T 2207/10016* (2013.01); *G06T 2207/10032* (2013.01)

(58) Field of Classification Search
CPC ............. G06T 7/80; G06T 2207/10016; G06T 2207/10032; G06T 5/80; B64U 2101/31; H04N 5/222; H04N 7/18
See application file for complete search history.

(56) References Cited

U.S. PATENT DOCUMENTS

| | | | | |
|---|---|---|---|---|
| 2016/0216245 | A1* | 7/2016 | Sutton | G01N 33/0098 |
| 2017/0077586 | A1 | 3/2017 | Li et al. | |
| 2017/0236258 | A1 | 8/2017 | Hsu et al. | |
| 2018/0068452 | A1 | 3/2018 | Ito et al. | |
| 2018/0205931 | A1 | 7/2018 | Yano et al. | |
| 2018/0343435 | A1* | 11/2018 | Mizuno | G06T 3/12 |
| 2019/0139225 | A1 | 5/2019 | Wang et al. | |
| 2019/0378254 | A1 | 12/2019 | Hsu et al. | |
| 2020/0151899 | A1 | 5/2020 | Suzuki et al. | |
| 2020/0320886 | A1* | 10/2020 | Zhou | G08G 5/55 |
| 2020/0380302 | A1 | 12/2020 | Nakazawa | |
| 2021/0012520 | A1* | 1/2021 | Zhou | G05D 1/0038 |
| 2021/0114748 | A1* | 4/2021 | Takahashi | G01J 3/51 |
| 2021/0183032 | A1 | 6/2021 | Hsu et al. | |
| 2021/0233250 | A1 | 7/2021 | Wang et al. | |
| 2021/0362839 | A1 | 11/2021 | Nakazawa et al. | |
| 2022/0012895 | A1 | 1/2022 | Wakui | |
| 2023/0281850 | A1* | 9/2023 | Harmsen | H04N 13/271 382/103 |

FOREIGN PATENT DOCUMENTS

| | | | | |
|---|---|---|---|---|
| CN | 112580683 | A | 3/2021 | |
| CN | 109377479 | B | 10/2021 | |
| JP | 2001-320621 | A | 11/2001 | |
| JP | 2014-160405 | A | 9/2014 | |
| JP | 6443700 | B2 | 12/2018 | |
| JP | 2019-179188 | A | 10/2019 | |
| JP | 2019-220163 | A | 12/2019 | |
| JP | 2020-80022 | A | 5/2020 | |
| JP | 2020-197833 | A | 12/2020 | |
| JP | 2021-77921 | A | 5/2021 | |
| JP | 6934116 | B1 | 9/2021 | |
| KR | 20220166689 | A * | 12/2022 | G06T 17/05 |
| WO | 2009/093587 | A1 | 7/2009 | |
| WO | 2020/204051 | A1 | 10/2020 | |

OTHER PUBLICATIONS

Neural Network Console, Improving the efficiency of annotation work using labeling tools (URL: https://youtu_be/RR_dTNrlspw?t=475), 3 pages.
International Search Report dated Apr. 5, 2022, issued in International Application No. PCT/JP2021/048570.
International Search Report dated Mar. 8, 2022, issued in International Application No. PCT/JP2021/048571.
Communication dated Jun. 13, 2025 issued by the United States Patent and Trademark Office in U.S. Appl. No. 18/003,385.
Zoph, et al., “Learning Data Augmentation Strategies for Object Detection”, arXiv:1906.11172v1 [cs.CV], Jun. 26, 2019, pp. 1 (13 pages).

* cited by examiner

INFORMATION PROCESSING SYSTEM, METHOD AND PROGRAM

CROSS REFERENCE TO RELATED APPLICATIONS

This application is a National Stage of International Application No. PCT/JP2021/048571 dated Dec. 27, 2021.

TECHNICAL FIELD

The present disclosure relates to an image processing technology.

BACKGROUND ART

Conventionally, there has been proposed a technology to control the posture of a drone by using detection values acquired from an optical sensor and a three-axis sensor (see Patent Literature 1). Further, there has been proposed a technology to apply a box boundary having orientation to an object detected using a machine learning model, thereby estimating orientation of the object (see Non Patent Literature 1).

CITATION LIST

Patent Literature

[PTL 1] Japanese Patent No. 6934116

Non Patent Literature

[NPL 1] Jingru Yi, et al., "Oriented Object Detection in Aerial Images with Box Boundary-Aware Vectors," WACV2021, p. 2150-2159

SUMMARY OF INVENTION

Technical Problem

Conventionally, aerial photographing using airplanes such as drones has been performed. However, aerial photographing takes time and effort for adjusting an imaging direction to a desired direction during imaging. Further, even if imaging is performed with an imaging direction adjusted to a desired direction during imaging, there is a possibility that the direction of a captured image is deviated from a desired direction due to various factors such as vibration of an airplane body, an error in a sensor, and a sudden gust of wind since the imaging is performed during flight.

In response to the above issue, the present disclosure has an object of correcting the orientation of a captured image captured during flight.

Solution to Problem

An example of the present disclosure provides an information processing system including: a captured image acquisition unit that acquires a captured image captured during flight by an imaging device mounted on an airplane; a relevant information acquisition unit that acquires information detected using a sensor mounted on the airplane; and an image correction unit that acquires, by correcting the captured image on a basis of information acquired using the relevant information, a correction image in which a predetermined direction in a state where the image is erected and a reference direction in the image are matched to each other.

The present disclosure can be grasped as an information processing apparatus, a system, a method performed by a computer, or a program performed by a computer. Further, the present disclosure can also be grasped as matters recorded in a recording medium readable by a computer, other apparatus, a machine, or the like, on which such a program is recorded. Here, a recording medium readable by a computer or the like refers to a recording medium that accumulates information, such as data and a program, through an electrical, magnetic, optical, mechanical, or chemical operation and can be read by a computer or the like.

Advantageous Effects of Invention

According to the present disclosure, it is possible to correct the orientation of a captured image captured during flight.

DESCRIPTION OF EMBODIMENTS

Hereinafter, an embodiment of a system, an information processing apparatus, a method, and a program according to the present disclosure will be described on the basis of the drawings. However, the embodiment described below is example and will not limit the system, the information processing apparatus, the method, and the program according to the present disclosure to the following specific configurations. In implementation, specific configurations corresponding to a mode of implementation may be appropriately employed, and various modifications or deformations may be performed.

The present embodiment will describe a case in which a technology according to the present disclosure is implemented for a system that confirms the installation state of an antenna device of a mobile base station using an image aerially photographed using a drone. However, the technology according to the present disclosure is widely usable for a technology to correct the orientation of a captured image, and an object to which the present disclosure applies is not limited to an example shown in the embodiment.

In recent years, aerial photographing using airplanes such as drones has been performed. However, aerial photographing requires time and effort for adjusting an imaging direction to a desired direction during imaging. Further, even if imaging is performed with an imaging direction adjusted to a desired direction during imaging, there is a case that the direction of a captured image is deviated from a desired direction due to various factors such as vibration of an airplane body, an error in a sensor, and a sudden gust of wind since the imaging is performed during flight. When such a deviation occurs, time and effort for manually correcting a captured image is also caused.

In view of such circumstances, the system, the information processing apparatus, the method, and the program according to the present embodiment correct the orientation of a photographing image captured during flight by an airplane such as a drone by referring to sensor output information or a satellite image during imaging.

System Configuration

Figure 1:
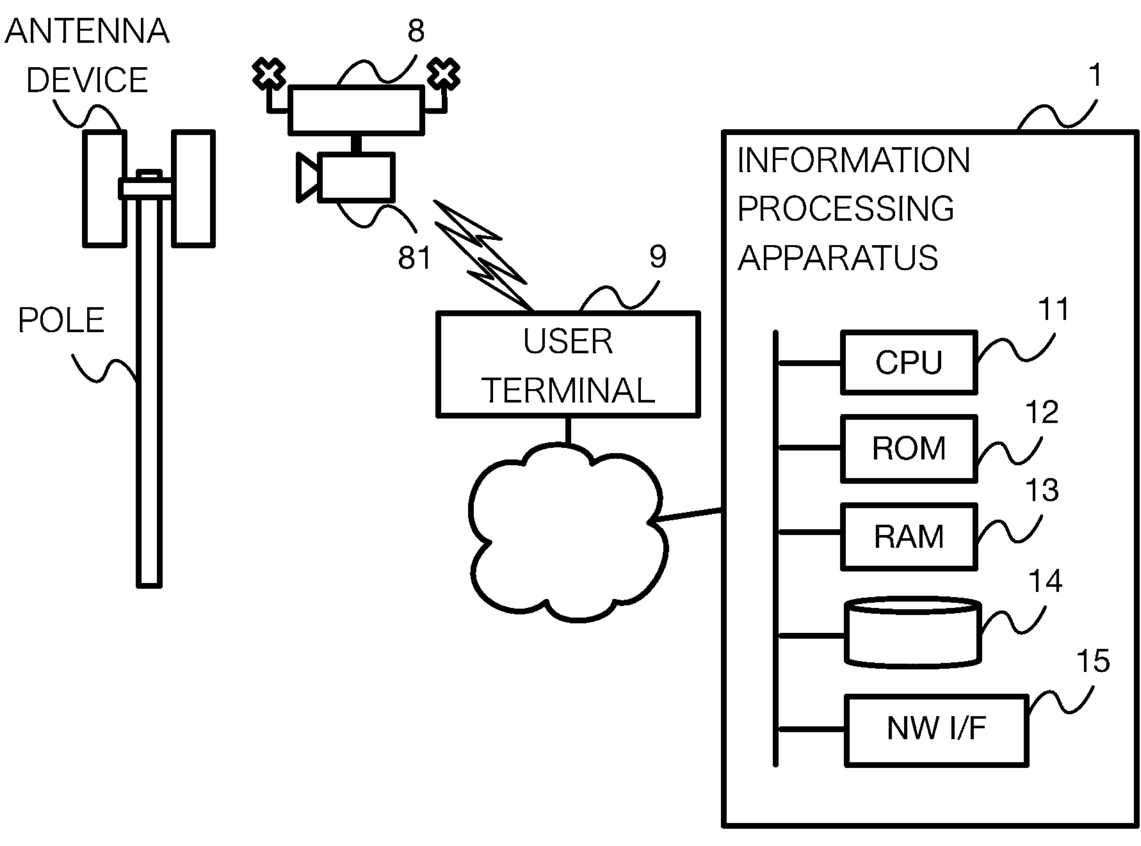
FIG. 1 is a schematic diagram showing the configuration of a system according to an embodiment.

FIG. 1 is a schematic diagram showing the configuration of the system according to the present embodiment. The system according to the present embodiment includes an information processing apparatus 1, a drone 8, and a user terminal 9 that are communicable with each other when connected to a network.

The information processing apparatus 1 is a computer including a CPU (Central Processing Unit) 11, a ROM (Read Only Memory) 12, a RAM (Random Access Memory) 13, a storage device 14 such as an EEPROM (Electrically Erasable and Programmable Read Only Memory) or a HDD (Hard Disk Drive), a communication unit 15 such as a NIC (Network Interface Card), or the like. However, appropriate omission, replacement, or addition is possible in the specific hardware configuration of the information processing apparatus 1 according to a mode of implementation. Further, the information processing apparatus 1 is not limited to an apparatus composed of a single housing. The information processing apparatus 1 may be realized by a plurality of apparatuses using a so-called cloud technology, a distributed computing technology, or the like.

The drone 8 is a small unmanned airplane of which the flight is controlled according to an input signal from an outside and/or a program recorded on a device and includes a propeller, a motor, a CPU, a ROM, a RAM, a storage device, a communication unit, an input device, an output device, or the like (not shown). However, appropriate omission, replacement, or addition is possible in the specific hardware configuration of the drone 8 according to a mode of implementation. Further, the drone 8 according to the present embodiment includes an imaging device 81 and captures an image of an object according to an input signal from an outside and/or a program recorded on the device when flying around the predetermined object (an antenna device in the present embodiment). In the present embodiment, a captured image is acquired to mainly confirm the orientation of an antenna among the installation states of an antenna device of a mobile base station. Therefore, the drone 8 and the imaging device 81 are controlled to take such a position and a posture as to be able to capture an image of the antenna device from immediately above the antenna device and capture an image to acquire an image (a so-called top view) of the antenna device seen from its immediate above side. Further, the drone 8 and the imaging device 81 are controlled to take such a position and a posture as to be able to capture an image of the antenna device from right beside the antenna device and capture an image to acquire an image (a so-called side view) of the antenna device seen from its right beside. Note that the imaging device 81 may be a camera including an image sensor or may be a depth camera including a ToF (Time of Flight) sensor or the like.

Further, the data of an image acquired by imaging may include, as meta data, data output from various devices mounted on the drone 8 or the imaging device 81 when the image is captured. Here, examples of various devices mounted on the drone 8 or the imaging device 81 include a three-axis acceleration sensor, a three-axis angular velocity sensor, a GPS (Global Positioning System) device, and a direction sensor (for example, a compass that outputs a roll angle, a yaw angle, and a pitch angle as a posture in world coordinates), or the like. Further, the data output from the various devices may include, for example, the accelerations of respective axes, the angular velocities of respective axes, positional information, compass direction, or the like. As a method for adding such meta data to image data, an EXIF (exchangeable image file format) has been known. However, a specific method for adding meta data to image data is not limited.

The user terminal 9 is a terminal device used by a user. The user terminal 9 is a computer including a CPU, a ROM, a RAM, a storage device, a communication unit, an input device, an output device, or the like (not shown). However, appropriate omission, replacement, or addition is possible in the specific hardware configuration of the user terminal 9 according to a mode of implementation. Further, the user terminal 9 is not limited to a device composed of a single housing. The user terminal 9 may be realized by a plurality of devices using a so-called cloud technology, a distributed computing technology, or the like. Via the user terminal 9, the user performs the generation of teacher data by making annotations on an image, the transfer of an image captured by the drone 8 to the information processing apparatus 1, or the like. Note that annotation in the present embodiment refers not only to the act of making annotations but also to one or more points (key points), labels, or the like added to an image by the annotation.

Figure 2:
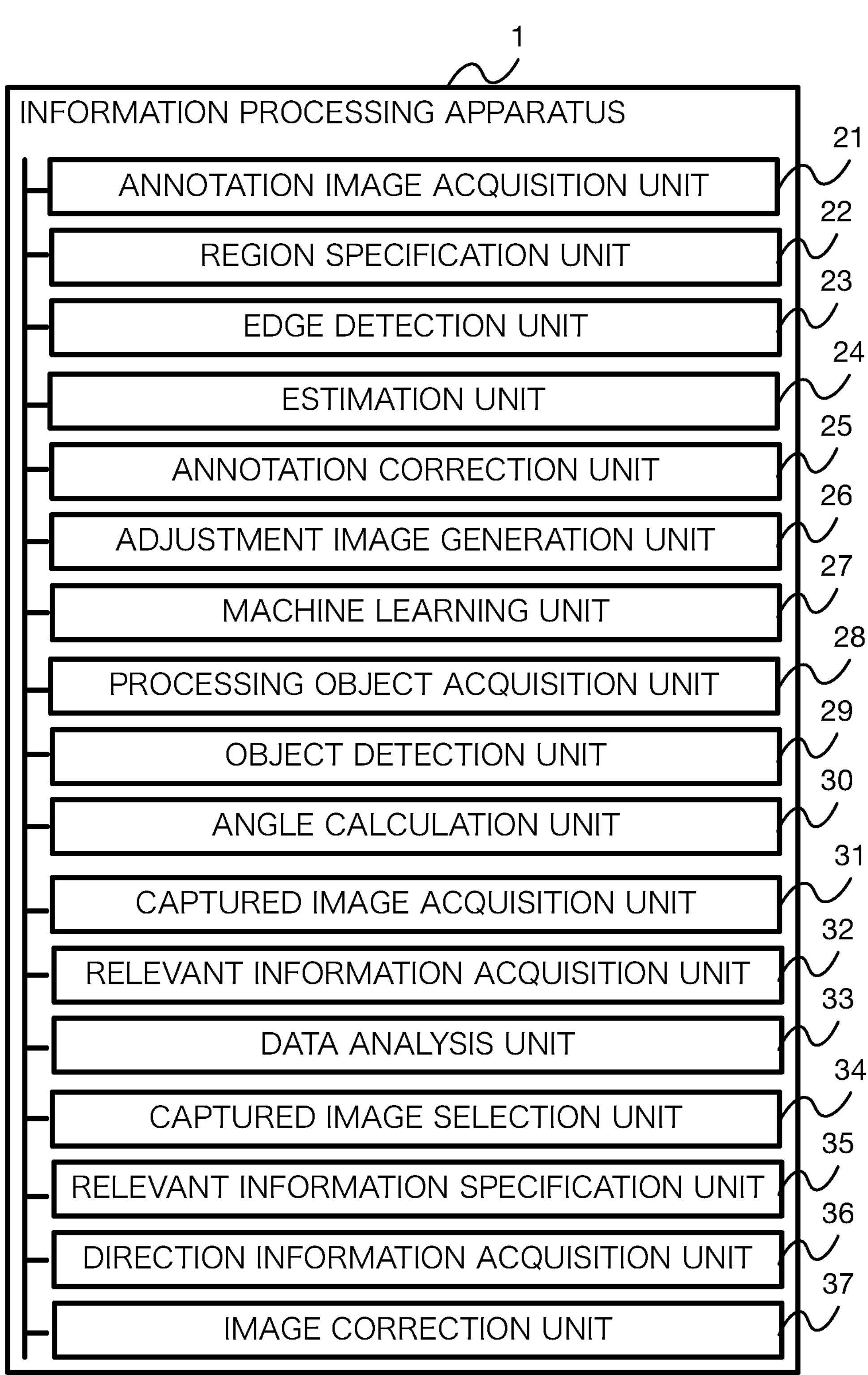
FIG. 2 is a diagram showing the outline of the functional configuration of an information processing apparatus according to the embodiment.

FIG. 2 is a diagram showing the outline of the functional configuration of the information processing apparatus 1 according to the present embodiment. The information processing apparatus 1 functions as, when a program recorded on the storage device 14 is read into the RAM 13 and run by the CPU 11 and the respective hardware provided in the information processing apparatus 1 is controlled, an information processing apparatus including an annotation image acquisition unit 21, a region specification unit 22, an edge detection unit 23, an estimation unit 24, an annotation correction unit 25, an adjustment image generation unit 26, a machine learning unit 27, a processing object acquisition unit 28, an object detection unit 29, an angle calculation unit 30, a captured image acquisition unit 31, a relevant information acquisition unit 32, a data analysis unit 33, a captured image selection unit 34, a relevant information specification unit 35, a direction information acquisition unit 36, and an image correction unit 37. Note that although respective functions provided in the information processing apparatus 1 are performed by the CPU 11 serving as a general-purpose processor in the present embodiment and other embodiments that will be described later, some or all of these functions may be performed by one or a plurality of dedicated processors.

The annotation image acquisition unit 21 acquires an image used as teacher data for machine learning, the image being with one or a plurality of annotations for showing a position at which a predetermined object (an antenna device in the present embodiment) in the image is shown.

Figure 3:
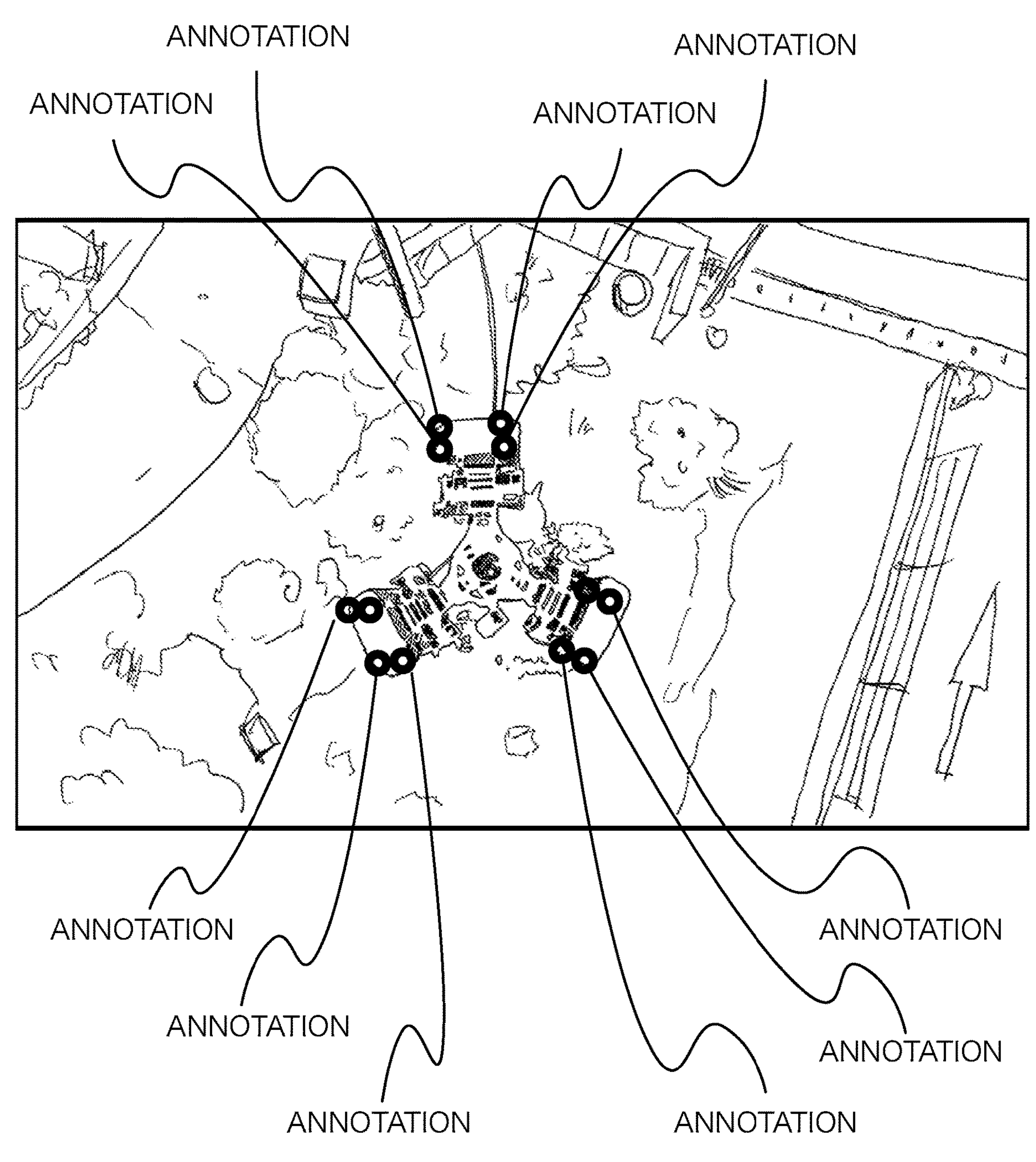
FIG. 3 is a diagram showing an example of an image on which annotations are made according to the embodiment.

FIG. 3 is a diagram showing an example of an image that is annotated and used as teacher data according to the present embodiment. In the present embodiment, teacher data is used to generate and/or update a learning model for detecting antenna devices for a mobile phone network installed in structures such as outdoor electric poles and steel towers from an image aerially photographed using the drone 8 that is in flight. Therefore, annotations for showing the positions of the antenna devices are made in advance on the image. In the example shown in FIG. 3, a plurality of points serving as annotations are made on the contours (in other words, the boundaries between antenna devices and a background) of three box-shaped members constituting the antenna devices in an image obtained by looking down from above (in a substantially vertical direction) and capturing an image of the antenna devices installed on the poles of a base station (the positions of the points are shown by circles in consideration of visibility in FIG. 3, but positions on which the annotations are made are the centers of the circles). Note that the present embodiment describes an example in which annotations are made as points showing positions in an image. However, the annotations can be any those which can show the region in the image where predetermined objects are captured, and the expression form of the annotations is not limited. The annotations may be, for example, straight lines, curved lines, graphics, fills or the like made on an image.

The region specification unit 22 specifies a region in which one or a plurality of annotations satisfy a predetermined criterion in an image. As a predetermined criterion, it is possible to use at least one or more of the density of annotations, the positions of annotations, the positional relationship between annotations, and/or the arrangement of annotations, and the like in an image. For example, the region specification unit 22 may specify a region in which the amount of annotations relative to area satisfies a predetermined criterion in an image. Further, for example, the region specification unit 22 may specify a region in which the positions of a plurality of annotations are in a predetermined relationship.

Figure 4:
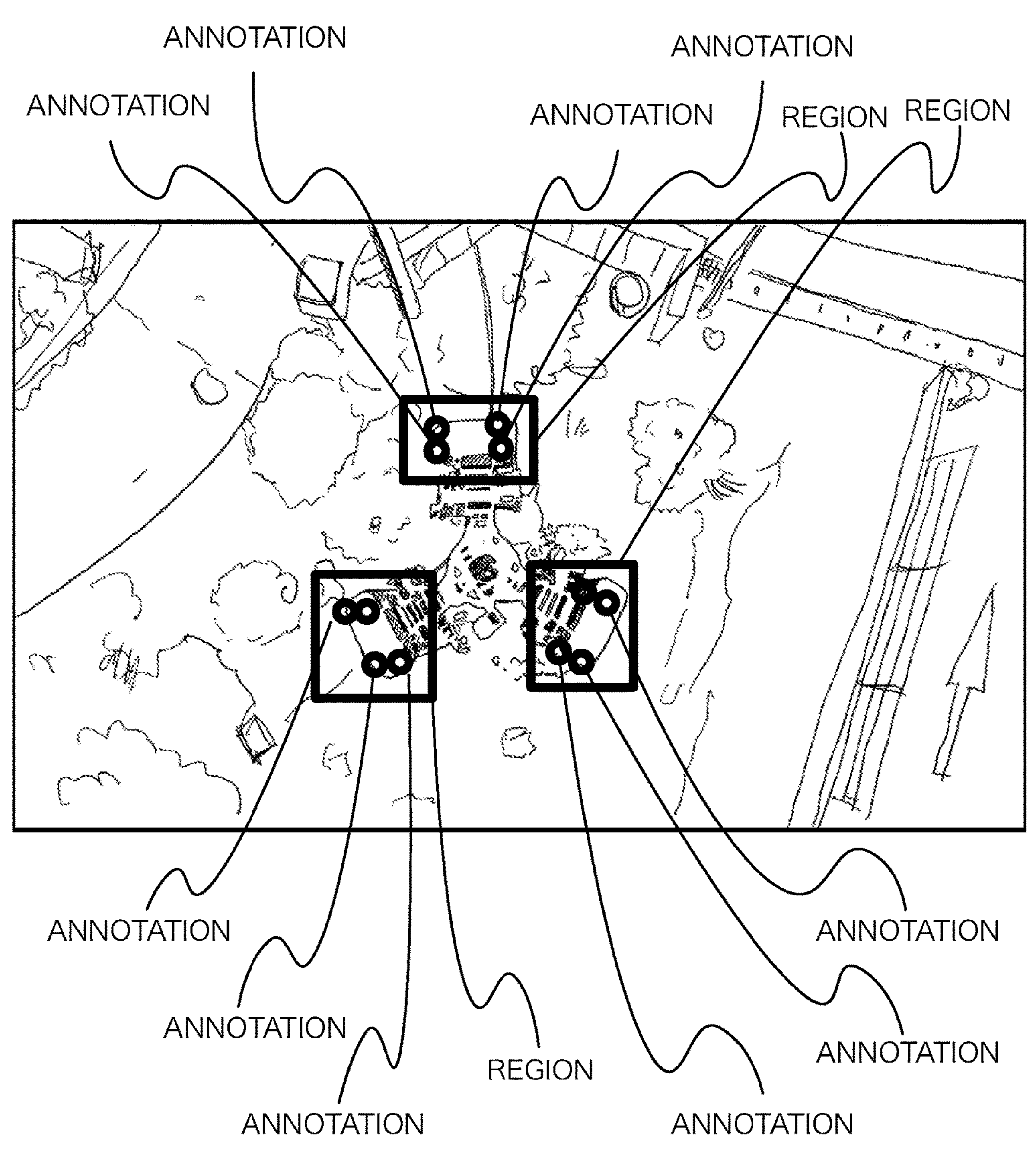
FIG. 4 is a diagram showing regions specified in an image in the embodiment.

FIG. 4 is a diagram showing specified regions in which a predetermined criterion is satisfied in an image in the present embodiment. It appears from an example shown in FIG. 4 that since regions in which one or a plurality of annotations satisfy a predetermined criterion rather than an entire image are specified, regions to be subjected to edge detection that will be described later are limited, and a processing load for the edge detection can be reduced compared with a case in which the edge detection is performed in the entire image. Here, a method for specifying the regions is not limited below, but a specific method for specifying the regions will be illustrated.

First, an example of a method for specifying a region in which the amount of annotations relative to area satisfies a predetermined criterion in an image will be described. For example, by calculating the center of gravity of a region formed by connecting annotations to each other and the area (for example, the number of pixels may be used as the area) in which the density of these annotations does not fall below predetermined density for each combination of some or all of the annotations in an image (a combination of four annotations adjacent to each other in the example shown in FIG. 4) and setting a region that includes the center of gravity as, for example, its center and has the area, the region specification unit 22 can specify a region in which the amount of the annotations relative to the area satisfies a predetermined criterion. Further, for example, by setting a circumscribed rectangle including these annotations for each combination of some or all of the annotations in an image and expanding the region of the rectangle vertically and horizontally until the density of the annotations calculated by the area of the rectangle and the number of the annotations reaches a predetermined threshold, the region specification unit 22 can specify a region in which the amount of the annotations relative to the area satisfies a predetermined criterion. However, the above illustrated methods are examples of methods for specifying a region, the region can be any one in which the amount of annotations relative to area satisfies a predetermined criterion, and other specific methods may be employed to specify the region.

Next, an example of a method for specifying a region in which the positions of a plurality of annotations are in a predetermined relationship will be described. For example, the region specification unit 22 specifies, for each combination of some or all of annotations in an image, the positional relationship between the annotations included in the combination. For example, each of the three box-shaped members constituting the antenna devices serving as predetermined objects according to the present embodiment has a substantially polygonal shape (a quadrangle in the example shown in FIG. 4) in which respective sides have a predetermined length relationship (ratio) in a plan view. Therefore, by determining, for each combination of annotations consisting of the same number of annotations as the number of vertices of the polygon (four in the example shown in FIG. 4), whether the annotations included in the combination have a positional relationship as the vertices of a preset substantial polygon in which respective sides have a predetermined length relationship (ratio), the region specification unit 22 can specify a predetermined region. Further, for example, by determining, for each combination of annotations, whether straight lines formed by the plurality of annotations are substantially parallel to each other or substantially orthogonal to each other, the region specification unit 22 may specify a predetermined region. However, the above illustrated methods are examples of methods for specifying a region, the region can be any one in which the positions of annotations relating to the region are in a predetermined relationship, and other specific methods may be employed to specify the region. Further, the present embodiment describes an example in which a rectangle region is specified. However, the shape of a region is not limited and may be, for example, a circle.

The edge detection unit 23 preferentially performs edge detection in a specified region or a range set on the basis of the region. That is, the edge detection unit 23 may use a region specified by the region specification unit 22 as it is, or may set a different range on the basis of the region (for example, the setting of a margin or the like) and use the range. Since an appropriate one of a conventional edge detection method and an edge detection method devised in the future may be selected and used as edge detection, its description will be omitted. The conventional edge detection method includes, for example, the gradient method, the Sobel method, the Laplacian method, the Canny method, or the like. However, an employable edge detection method or an employable filter is not limited.

The estimation unit 24 estimates, on the basis of a detected edge, a position at which an annotation was intended to be made. By referring to an edge detected around the position of an annotation, the estimation unit 24 estimates a position at which the annotation was intended to be made. More specifically, for example, the estimation unit 24 may estimate a position closest to an annotation among edges detected inside a region as a position at which the annotation was intended to be made. Further, for example, the estimation unit 24 may estimate a position having a predetermined characteristic among edges detected inside a region as a position at which an annotation was intended to be made. Here, as a position having a predetermined characteristic, a position at which edge lines cross each other, a position at which edge lines form an angle, or a position at which edge lines have a predetermined shape, or the like is illustrated.

The annotation correction unit 25 corrects, by moving the position of an annotation to a position estimated by the estimation unit 24, the annotation so as to be along a detected edge. As described above, a position estimated by the estimation unit 24 is, for example, a position closest to an annotation, a position at which edge lines cross each other, a position at which edge lines form an angle, a position at which edge lines have a predetermined shape, or the like among edges detected inside a region. In this manner, it is possible to correct the position of an annotation into the contour of a predetermined object in an image, the contour being assumed to be intended by an annotator (in other words, a boundary with a background).

Figure 5:
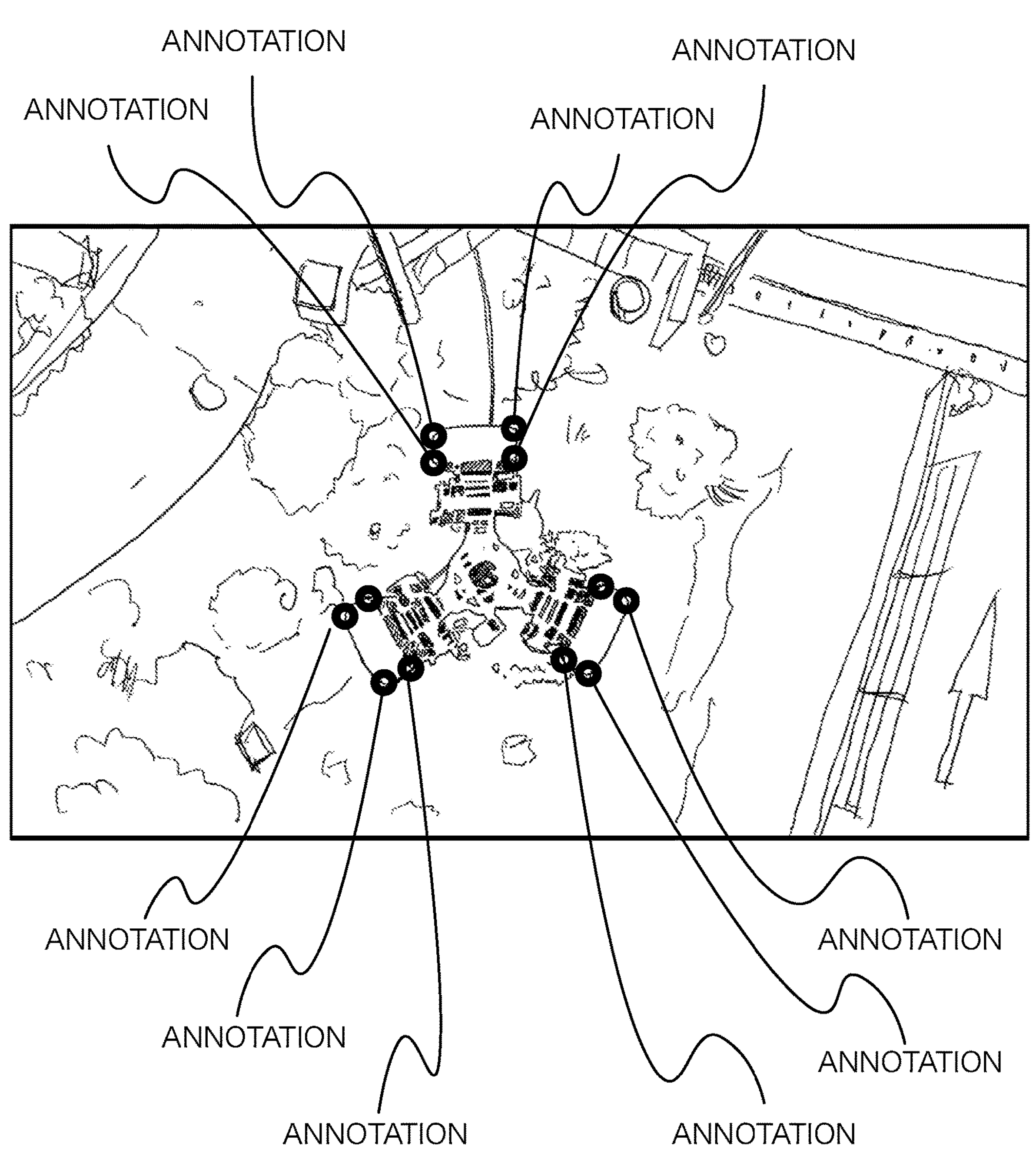
FIG. 5 is a diagram showing an example of an image in which annotations are corrected in the embodiment.

FIG. 5 is a diagram showing an example of an image in which annotations are corrected in the present embodiment. It appears from the example shown in FIG. 5 that the positions of annotations made at positions deviated from edges in FIG. 3 are corrected and the annotations are correctly made at the contours (in other words, boundaries with a background) of predetermined objects (antenna devices in the present embodiment).

The adjustment image generation unit 26 generates an adjustment image in which the parameters of an image are adjusted. Here, the adjustment image generation unit 26 generates an adjustment image in which the parameters of an image are adjusted to make a predetermined object hardly detected. An adjustment method for making a predetermined object hardly detected includes, for example, adjustment to make pixels capturing a predetermined object (an antenna device in the present embodiment) and pixels capturing a background (for example, a ground, a building, a plant, a structure on the ground, or the like) of the predetermined object become close to each other or the same in the parameters of the respective pixels (in other words, adjustment to make the color of the predetermined object become a protective color of a background color). Here, the adjustment image generation unit 26 may generate an adjustment image in which a parameter relating to at least any of the brightness of an image, exposure, white balance, hue, chroma, lightness, sharpness, noise, contrast, or the like among the parameters of the image is adjusted.

Further, the adjustment image generation unit 26 may generate a plurality of adjustment images that differ from each other on the basis of one image. That is, the adjustment image generation unit 26 may generate a first adjustment image in which the parameters of an image are adjusted and a second adjustment image in which the parameters of the image are adjusted so as to be made different from those of the first adjustment image. On this occasion, a plurality of generated adjustment images may include adjustment images in which the same types of parameters are adjusted by different degrees and/or adjustment images in which different types of parameters are adjusted. Note that a plurality of the same annotations may be made on the plurality of adjustment images. The annotations may be annotations corrected through the edge detection of the one image or annotations corrected through the edge detection of any adjustment image. The edge detection unit 23 may perform the edge detection of an adjustment image generated by the adjustment image generation unit 26. The estimation unit 24 may estimate a position closest to an annotation among edges detected in an adjustment image as a position at which the annotation was intended to be made. Here, when edge lines exhibit characteristics such as a predetermined positional relationship or the like in an adjustment image generated by the adjustment image generation unit 26, the estimation unit 24 may estimate a position closest to an annotation among edges detected in the adjustment image as a position at which the annotation was intended to be made.

The machine learning unit 27 generates, by performing machine learning using teacher data including an image corrected by the annotation correction unit 25 and/or an adjustment image, a learning model for detecting a predetermined object in an image. For example, the present embodiment illustrates the generation of a learning model for detecting a predetermined object in an image by supervised machine learning using a PyTorch library as will be illustrated in the angle calculation unit 30 below (see NPL 1). However, since an appropriate one of a conventional machine learning algorithm and a machine learning algorithm devised in the future may be selected and used as machine learning, its description will be omitted.

Here, an image used as teacher data by the machine learning unit 27 can be any image on which one or a plurality of annotations for showing a position in the image at which a predetermined object is shown are made, and the type of an image used as teacher data is not limited. The machine learning unit 27 can use as teacher data an intact image acquired by the annotation image acquisition unit 21, an image corrected by the annotation correction unit 25, an adjustment image generated by the adjustment image generation unit 26, an adjustment image generated by the adjustment image generation unit 26 on the basis of an image corrected by the annotation correction unit 25, or the like. Further, as described above, teacher data including a plurality of adjustment images different from each other generated on the basis of one image, that is, a first adjustment image and a second adjustment image, may be used as an adjustment image. Note that a plurality of the same annotations may be made on each of an image and an adjustment image used as teacher data.

The processing object acquisition unit 28 acquires an image to be processed. In the present embodiment, an image to be processed is an image aerially photographed using the imaging device 81 mounted on the drone 8 that is in flight. However, an image to be processed can be any image in which a predetermined object in the image is desired to be detected, and may be an RGB image or a depth image. The type of an image to be processed is not limited.

The object detection unit 29 detects, using a learning model for detecting a predetermined object in an image generated by the machine learning unit 27, a predetermined object in an image to be processed. In the present embodiment, the object detection unit 29 detects an antenna device installed outdoors as a predetermined object in an image to be processed. However, the object detection unit 29 is allowed to detect various objects from an image according to an image used as teacher data and an object on which an annotation is made, and the type of a predetermined object detected using the technology according to the present disclosure is not limited. Further, a detected predetermined object is generally specified in the same method as that for an annotation made on teacher data. That is, when an annotation is a point showing the contour of a predetermined object, the object detection unit 29 specifies a predetermined object in an image to be processed, by adding a point to the contour of the predetermined object. However, a method for specifying a predetermined object is not limited, and the predetermined object may be specified in a method different from that for an annotation.

The angle calculation unit 30 calculates the angle of a detected object relative to a predetermined criterion in an image to be processed. More specifically, in the present embodiment, the angle calculation unit 30 calculates the angle of a detected object relative to any of a predetermined compass direction, a vertical direction, and a horizontal direction in an image to be processed. Here, a method for calculating an angle by the angle calculation unit 30 is not limited, but a method for detecting the orientation of an object using, for example, a method such as detection (see NPL 1) by a machine learning model and detection by a comparison with a previously-defined object shape and calculating an angle formed by the detected orientation of the object and a reference direction in an image to be processed may be employed.

The captured image acquisition unit 31 acquires a series of a plurality of captured images of a predetermined imaging object captured during flight by the imaging device 81 mounted on the drone 8. Note that the imaging timing of respective captured images included in a plurality of captured images is not limited but the captured images may be captured at a timing at which imaging instructions arbitrarily provided by an operator are received or may be captured at a previously-set periodical timing (for example, for every one second). Further, captured images may be those captured as moving images. Note that a device used to acquire captured images during flight can be any manned or unmanned device (airplane) able to fly with an imaging device mounted thereon and is not limited to a so-called drone illustrated in the present embodiment.

The relevant information acquisition unit 32 acquires, as relevant information, sensor output data regarding the posture of the drone 8 or the imaging device 81 and positional information of the drone 8 or the imaging device 81. As described above, the drone 8 or the imaging device 81 according to the present embodiment has a three-axis acceleration sensor, a three-axis angular velocity sensor, a GPS device, a direction sensor, or the like mounted thereon, and acquires relevant information including three-dimensional information and positional information showing the flight position of the drone 8. However, the types and combinations of sensors used to acquire relevant information are not limited to illustrated examples in the present embodiment. Moreover, the relevant information acquisition unit 32 may acquire, as relevant information, captured time information of a captured image and/or detected time information of sensor output data. In the present embodiment, these relevant information is acquired by the extraction of meta data (such as an EXIF) added to captured image data.

The data analysis unit 33 acquires motion information in a time series of the drone 8 or the imaging device 81 by analyzing a plurality of captured images continuously captured in a time series or relevant information continuously acquired in a time series. For example, by comparing adjacent captured images with each other for a plurality of captured images continuously captured in a time series and calculating a parameter regarding the movement of an imaging object in the captured images (for example, when the same object is captured in different positions between the first and second temporally-successive captured images, a vector from a position at which an image of the object is captured in a first captured image to a position at which an image of the object is captured in a second captured image), the data analysis unit 33 can acquire motion information (here, parameters showing the size and direction of motion) based on the captured images and digitize the motion of the device at respective timings in a time series. Further, for example, by referring to relevant information continuously acquired in a time series and calculating values output from three-axis sensors, the movement of positional information, a change in an azimuth angle, or the like, the data analysis unit 33 can acquire motion information based on the relevant information (parameters showing the size and direction (including a rotational angle) of motion) and digitize the motion of the device at respective timings in a time series. Note that the data analysis unit 33 may acquire motion information by extracting the characteristic points of continuously-photographed respective captured images. Here, the data analysis unit 33 may acquire motion information by performing matching or the like related to the characteristic points of respective captured images.

On this occasion, the data analysis unit 33 may acquire motion information of the drone 8 or the imaging device 81 during imaging by analyzing captured images, and may acquire motion information of the drone 8 or the imaging device 81 during detection by analyzing relevant information. The acquisition of both motion information based on captured images and motion information based on relevant information makes it possible to compare a plurality of types of the motion information with each other.

The captured image selection unit 34 selects, on the basis of motion information acquired by the data analysis unit 33, a captured image in which the state of the imaging device 81 during imaging is close to a stationary state. For example, by selecting a captured image in which a parameter showing motion is the smallest or a captured image in which the parameter is less than a threshold among captured images, the captured image selection unit 34 selects a captured image in which the state of the imaging device 81 during imaging is close to a stationary state. In this manner, a captured image that has less fluctuations and is precise can be selected as a processing object subjected to image correction or the like that will be described later.

The relevant information specification unit 35 specifies relevant information (such as sensor output data and positional information) acquired simultaneously with or nearly simultaneously with a captured image. Here, a method for specifying relevant information corresponding to a captured image is not limited. For example, meta data such as EXIF information added to data of an object captured image may be simply specified as corresponding relevant information, or relevant information on the closest time may be specified as corresponding relevant information by the comparison between time information added to a captured image and time information added to relevant information. However, actually, there is a case that the imaging timing of a captured image and the recording timing of meta data added to the captured image are deviated from each other, or is a case that time information added to a captured image and time information added to sensor output data are deviated from each other.

Therefore, in the present embodiment, relevant information acquired simultaneously with or nearly simultaneously with a captured image (hereinafter called "relevant information corresponding to a captured image") is specified by the comparison between motion information acquired by analyzing the captured images and motion information acquired by analyzing the relevant information. More specifically, in the present embodiment, both motion information based on captured images and motion information based on relevant information are acquired by the data analysis unit 33 and then compared with each other. Then, when a motion characteristic specified from the motion information based on a captured image and a motion characteristic specified from the motion information based on relevant information are common or close, the captured image and the relevant information are estimated to be related to the same time point. Here, the motion characteristic can be, for example, a spike appearing in the parameter of the motion information as sudden motion of the device at certain time point, or the motion of characteristic parameter other than the spike may be referred. Then, the relevant information specification unit 35 can specify (matching) relevant information corresponding to a captured image on the basis of the estimation results.

Note that in specifying (matching) relevant information corresponding to a captured image, a method in which a captured image and relevant information are directly linked to each other by the comparison of motion information to specify the relevant information corresponding to the captured image may be employed, or a method in which the difference between time information added to a captured image and time information added to relevant information, the captured image and the relevant information being estimated to correspond to each other, is estimated as the length of deviation and relevant information corresponding to a captured image is specified on the basis of the estimated length of the deviation may be employed. As a specific example, it is assumed that a time stamp added to a captured image, among a series of a plurality of captured images, relating to a certain motion characteristic (such as spike) in motion information based on the captured images is at 13:01:00.005 but relevant information relating to common or close motion characteristic detected in motion information based on the relevant information is relevant information added to a captured image of a time stamp at 13:01:00.505. In this case, it is found that relevant information corresponding to a selected captured image is not relevant information that is added to the selected captured image but relevant information that is added to a captured image taken 0.500 seconds after the selected captured image, in the series of the plurality of captured images. At this time, when a captured image selected by the captured image selection unit 34 as an image of a state close to a stationary state is a captured image at 13:02:03.456, the relevant information specification unit 35 specifies meta data added to a captured image at 13:02:03.956 as relevant information corresponding to the selected captured image.

Further, there is a possibility that the length of the above deviation changes with the lapse of a time due to a reason such as a fluctuation in the processing load of a processor (the length of the deviation is not constant). Therefore, in specifying (matching) relevant information corresponding to captured images, a method for generating a sequence alignment using the linkage between sequences expected to expand or contract, for example, a method such as dynamic programming may be employed instead of the above method in which it is assumed that sequences do not expand or contract. In this case, the relevant information specification unit 35 specifies relevant information corresponding to a captured image on the basis of a sequence alignment (the linkage between sequences) generated by the comparison between a sequence of a parameter included in motion information based on the captured images and a sequence of the parameter included in motion information based on the relevant information. By the employment of such a method, a captured image and relevant information can be correctly linked to each other even when the length of deviation is not constant. Note that the relevant information specification unit 35 may mutually interpolate the sequence of the parameter included in motion information based on captured images and the sequence of the parameter included in motion information based on relevant information. Further, relevant information specification unit 35 may interpolate the sequence of the parameter on the basis of relevant information acquired in the past. At this time, the relevant information specification unit 35 may interpolate the sequence on the basis of a learned machine learning model or a statistical model.

The direction information acquisition unit 36 acquires direction information in a captured image with the earth as a reference on the basis of information on the posture of the drone 8 or the imaging device 81 acquired as relevant information. The direction information acquired here can be any information showing a direction on geodesy and may include a compass direction and a vertical direction. On this occasion, the direction information acquisition unit 36 acquires direction information on the basis of relevant information (sensor output data and/or positional information or the like) corresponding to a captured image. Since a known calculation method or the like may be used to acquire a compass direction or a vertical direction based on sensor output data, positional information, or the like, the description will be omitted.

Figure 6:
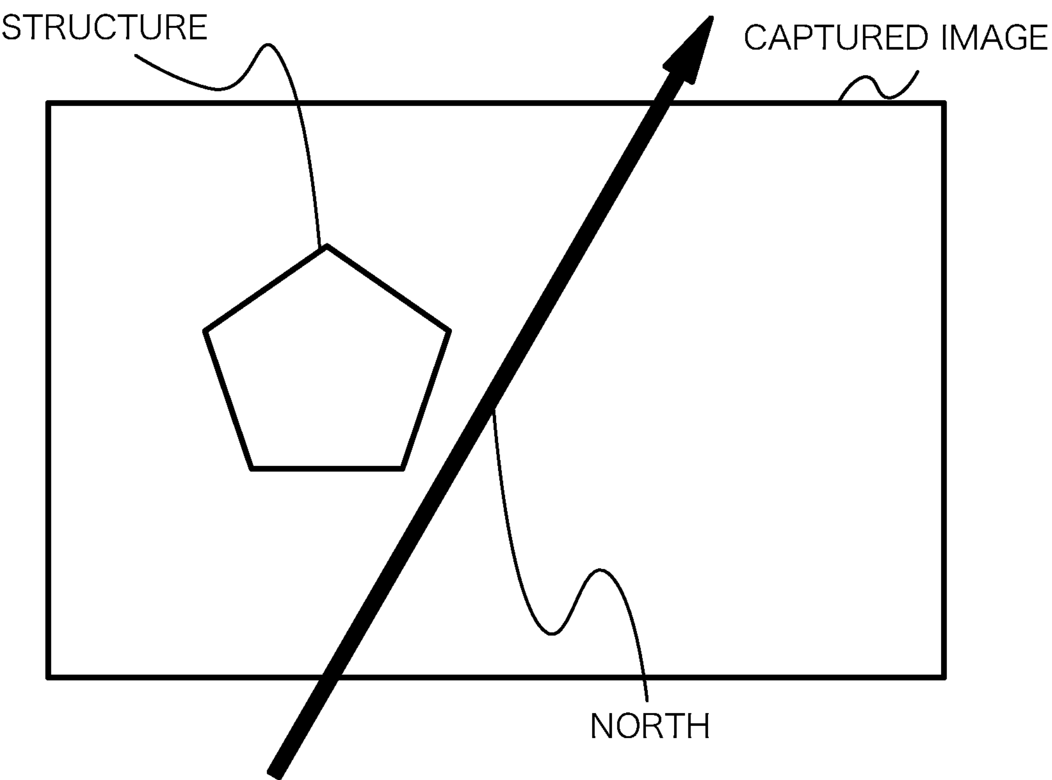
FIG. 6 is a diagram showing an example of direction information in a captured image acquired in the embodiment.

FIG. 6 is a diagram showing an example of direction information in a captured image acquired by the direction information acquisition unit 36 in the present embodiment. A pentagonal graphic shown in the figure is a structure as a captured object, and a captured image in FIG. 6 is a top view image of the captured object when captured from above. Further, an arrow in the figure shows a compass direction (here, a north) acquired as direction information in the captured image and is not captured as an image.

The image correction unit 37 acquires, by correcting a selected captured image on the basis of direction information, a correction image in which a predetermined direction in a state where the image is erected and a reference direction in the image are matched to each other. Here, a specific correction method includes, for example, the rotation of an image. However, a specific method for correcting an image is not limited, and other correction methods (for example, affine transformation or the like) may be employed. Further, the upward direction or the like of an image may be employed as a predetermined direction in a state where the image is erected. As a reference direction in an image, a predetermined compass direction, a vertical direction, a horizontal direction, or the like may be employed. For example, when a captured image is a top view image in which an image of an object is captured from above, a predetermined compass direction may be employed as a reference direction. When a captured image is a side view image in which an image of an object is captured sideways, a vertical direction or a horizontal direction may be employed as a reference direction. In this manner, a correction image in which an upward direction of an image in a state where the image is erected and a north in the captured image are matched to each other or a correction image in which an upward direction of an image in a state where the image is erected and a vertical direction in the captured image are matched to each other can be acquired. Note that any compass direction may be employed as a predetermined compass direction but is, for example, a "north." The present embodiment gives a description using a true north as an example, but a magnetic north may be used. The true north and the magnetic north are convertible on the basis of a latitude and a longitude.

Figure 7:
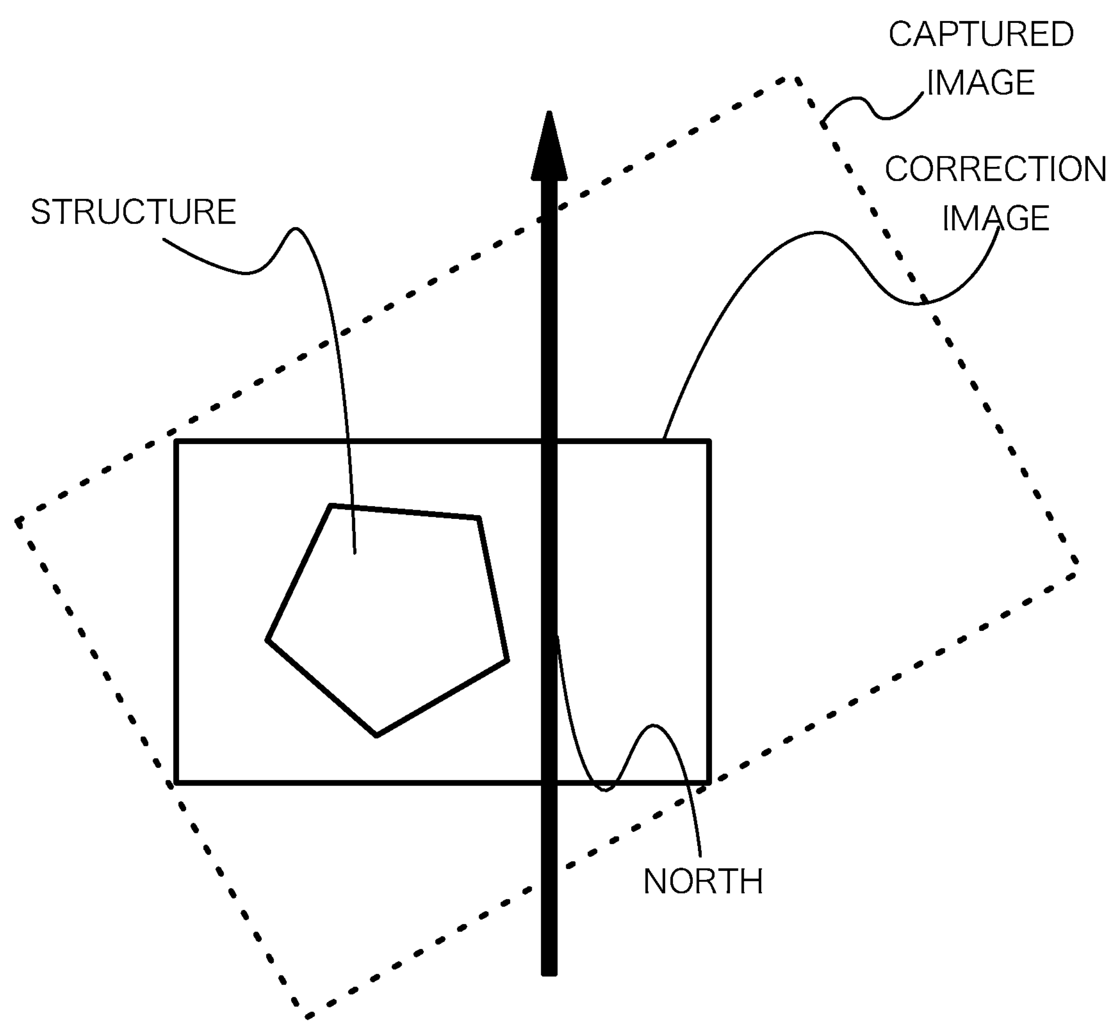
FIG. 7 is a diagram showing an example of a correction image obtained when a captured image is rotated and corrected in the embodiment.

FIG. 7 is a diagram showing an example of a correction image acquired when a captured image is rotated and corrected by the image correction unit 37 in the present embodiment. It is found from the example shown in FIG. 7 that, when the captured image shown in FIG. 6 is rotated and corrected on the basis of direction information, a correction image in which an upward direction in a state where the image is erected and a north that is a reference direction in the image are matched to each other is acquired.

Flow of Processing

Next, the flow of processing performed by the information processing apparatus 1 according to the present embodiment will be described. Note that the specific content and the processing order of the following processing are an example for carrying out the present disclosure. The specific processing content and the processing order may be appropriately selected according to the embodiment of the present disclosure.

Before performing the following annotation correction processing, the data expansion processing, and the machine learning processing, a user prepares in advance teacher data including an image on which annotations are made. Since the present embodiment uses the technology according to the present disclosure in a system that aims to detect antenna devices installed outdoors as predetermined objects, the user acquires a plurality of images including an image in which the antenna devices are reflected. Note that the plurality of images may include an image in which the antenna devices are not reflected. Then, the user generates teacher data by making annotations showing the contours of the antenna devices on the plurality of acquired images. On this occasion, the operation of making the annotations on the images may be manually performed by an annotator or may be performed automatically. Since a conventional annotation assisting technology may be employed, the description of the details of processing to make the annotations on the images will be omitted.

Figure 8:
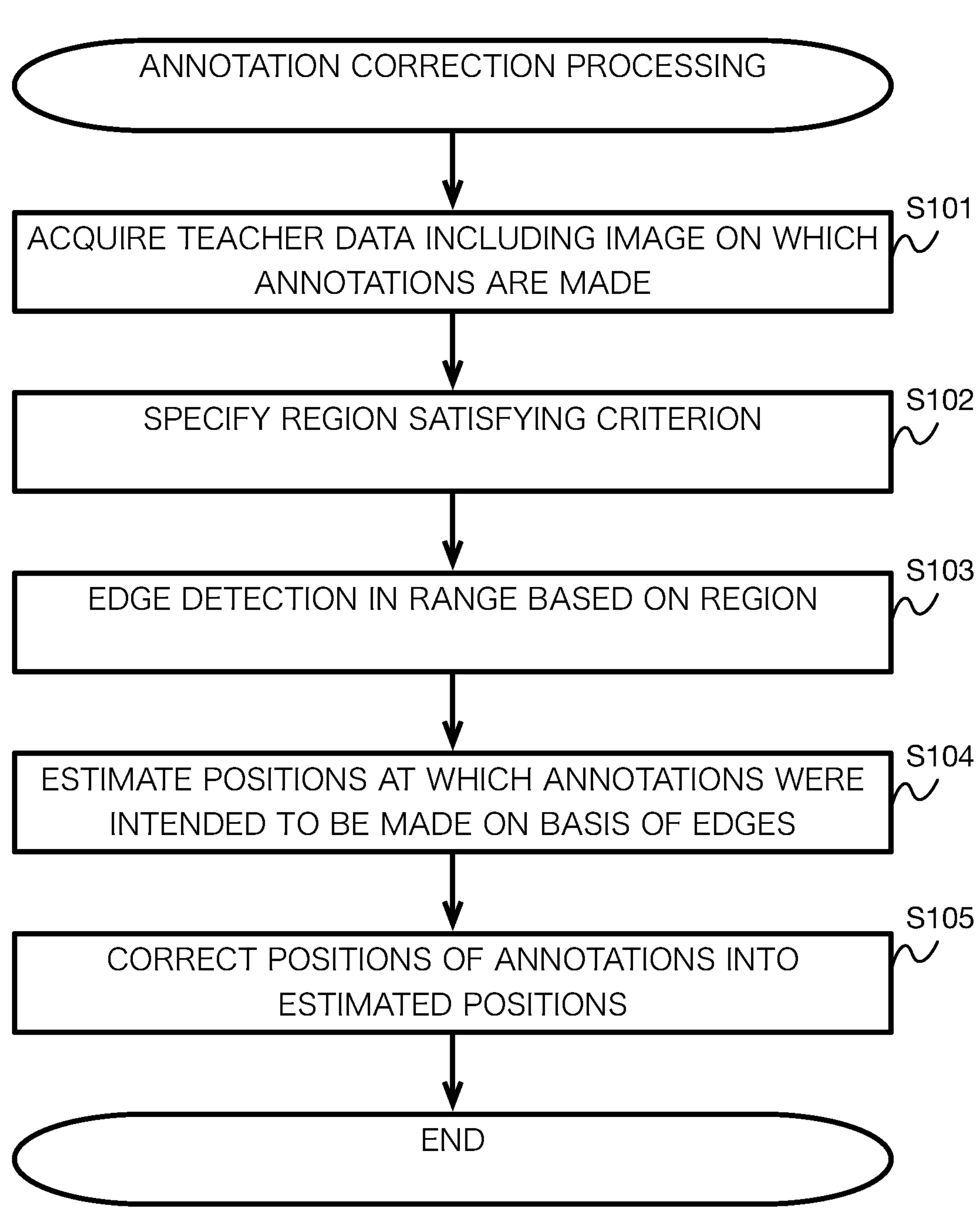
FIG. 8 is a flowchart showing the flow of annotation correction processing according to the embodiment.

FIG. 8 is a flowchart showing the flow of the annotation correction processing according to the present embodiment. The processing shown in this flowchart is performed when teacher data including an image on which annotations are made is prepared and instructions to perform annotation correction are provided by a user.

In step S101, teacher data including an image on which annotations are made is acquired. The annotation image acquisition unit 21 acquires as teacher data an image on which one or a plurality of annotations for showing a position at which a predetermined object (an antenna device in the present embodiment) in an image is shown are made. After that, the processing proceeds to step S102.

In steps S102 and S103, a region in which one or a plurality of annotations satisfy a predetermined criterion is specified, and edges are detected in the specified region or the like. The region specification unit 22 specifies a region in which the one or the plurality of annotations satisfy a predetermined criterion in the image of the teacher data acquired in step S101 (step S102). Then, the edge detection unit 23 performs edge detection in the region specified in step S102 or a range set on the basis of the region (step S103). After that, the processing proceeds to step S104.

In steps S104 and S105, annotations are corrected so as to be along detected edges. The estimation unit 24 estimates, on the basis of edges detected in step S103, positions at which the annotations were intended to be made (step S104). Then, the annotation correction unit 25 corrects the annotations so as to be along the detected edges by moving the positions of the annotations to the positions estimated in step S104 (step S105). After that, the processing shown in this flowchart ends.

According to the above annotation correction processing, it is possible to improve the efficiency of processing to correct annotations made on an image used as teacher data for machine learning and correct the annotations with a smaller processing load over conventional art.

Figure 9:
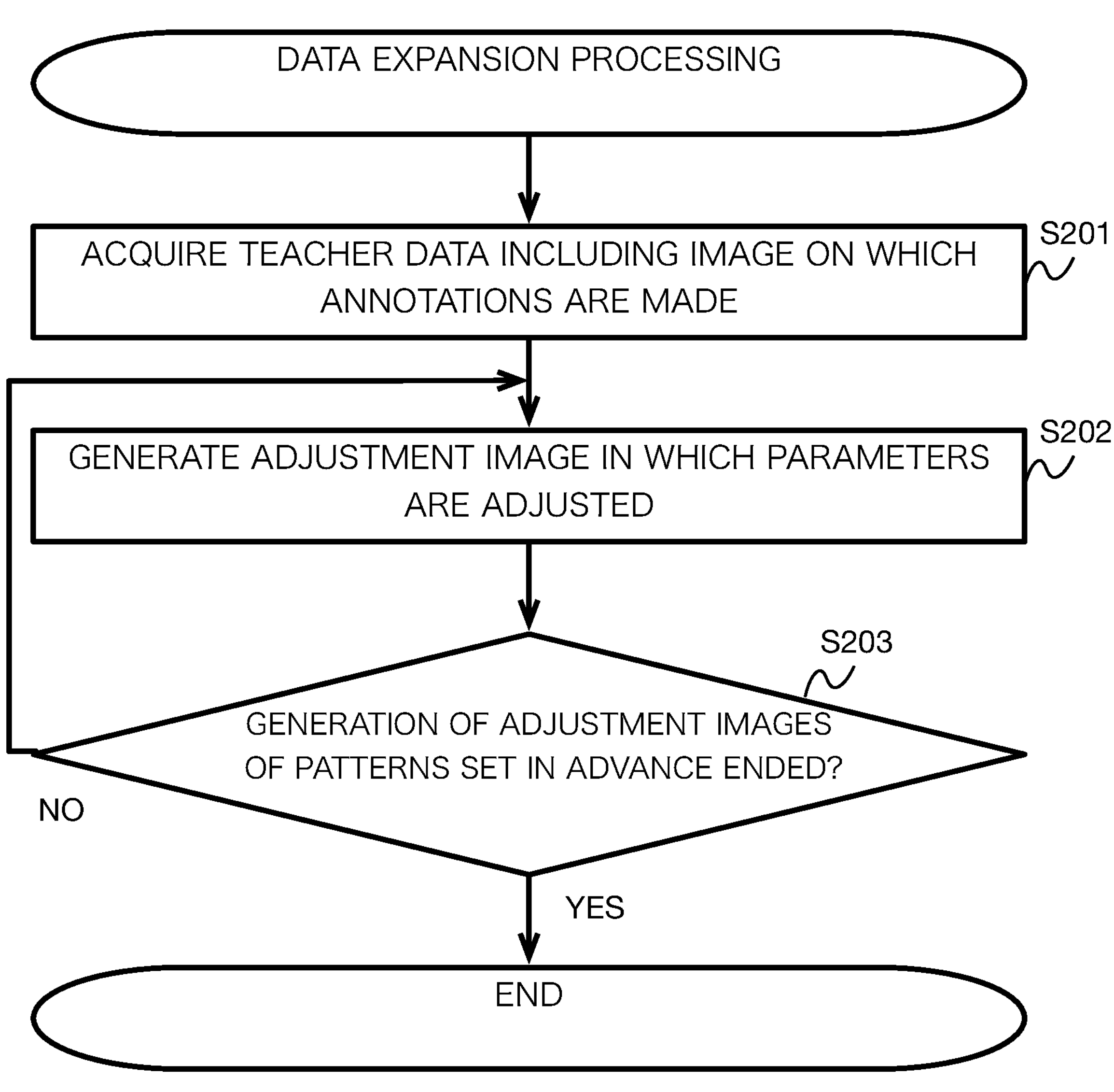
FIG. 9 is a flowchart showing the flow of data expansion processing according to the embodiment.

FIG. 9 is a flowchart showing the flow of the data expansion processing according to the present embodiment. The processing shown in this flowchart is performed when teacher data including an image on which annotations are made is prepared and instructions to perform data expansion are provided by a user.

In step S201, teacher data including an image on which annotations are made is acquired. The annotation image acquisition unit 21 acquires as teacher data an image on which one or a plurality of annotations for showing a position at which a predetermined object (an antenna device in the present embodiment) in an image is shown are made. Note that the image acquired here on which the annotations are made is preferably an image that has been subjected to annotation correction by the annotation correction processing described with reference to FIG. 8, but an image that has not been subjected to the annotation correction may be acquired. After that, the processing proceeds to step S202.

In steps S202 and S203, one or a plurality of adjustment images are generated. The adjustment image generation unit 26 generates an adjustment image in which the parameters of the image acquired in step S201 are adjusted (step S202). When the adjustment image is generated, a determination is made as to whether the generation of the adjustment images of all patterns set in advance for the image acquired in step S201 has ended (step S203). When the generation has not ended (NO in step S203), the processing returns to step S202. That is, the adjustment image generation unit 26 repeatedly performs the processing of step S202 while changing the content of parameter adjustment on the basis of the one image acquired in step S201 to generate a plurality of different adjustment images. When the generation of the adjustment images of all the patterns set in advance has ended (YES in step S203), the processing shown in this flowchart ends.

According to the above data expansion processing, it is possible to reduce time and effort for improving the performance of a learning model generated by machine learning using an image on which annotations are made.

Figure 10:
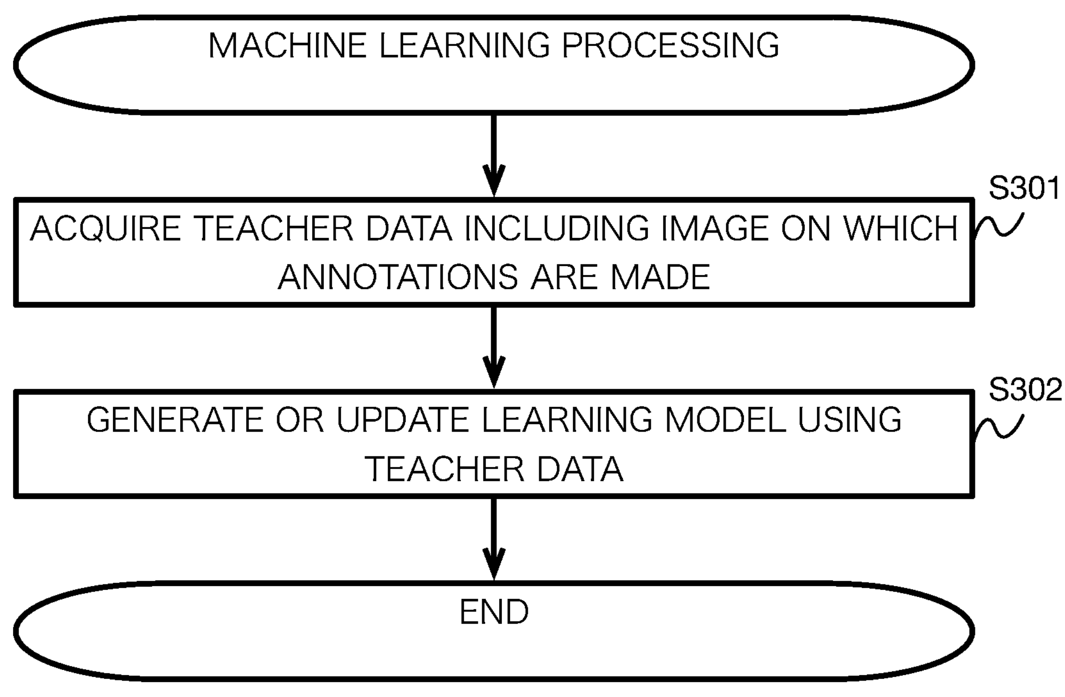
FIG. 10 is a flowchart showing the flow of machine learning processing according to the embodiment.

FIG. 10 is a flowchart showing the flow of the machine learning processing according to the present embodiment. The processing shown in this flowchart is performed when teacher data including an image on which annotations are made is prepared and instructions to perform machine learning are provided by a user.

In step S301, teacher data including an image on which annotations are made is acquired. The annotation image acquisition unit 21 acquires as teacher data an image on which one or a plurality of annotations for showing a position at which a predetermined object (an antenna device in the present embodiment) in an image is shown are made. Note that the image acquired here on which the annotations are made is preferably an image that has been subjected to annotation correction by the annotation correction processing described with reference to FIG. 8 and/or an adjustment image generated by the data expansion processing described with reference to FIG. 9, but an image that has not been subjected to both the annotation correction and the parameter adjustment may be acquired. After that, the processing proceeds to step S302.

In step S302, a learning model is generated or updated. The machine learning unit 27 generates a learning model for detecting a predetermined object (an antenna device in the present embodiment) in an image or updates an existing learning model, by performing machine learning using the teacher data including the image acquired in step S301. After that, the processing shown in this flowchart ends.

Figure 11:
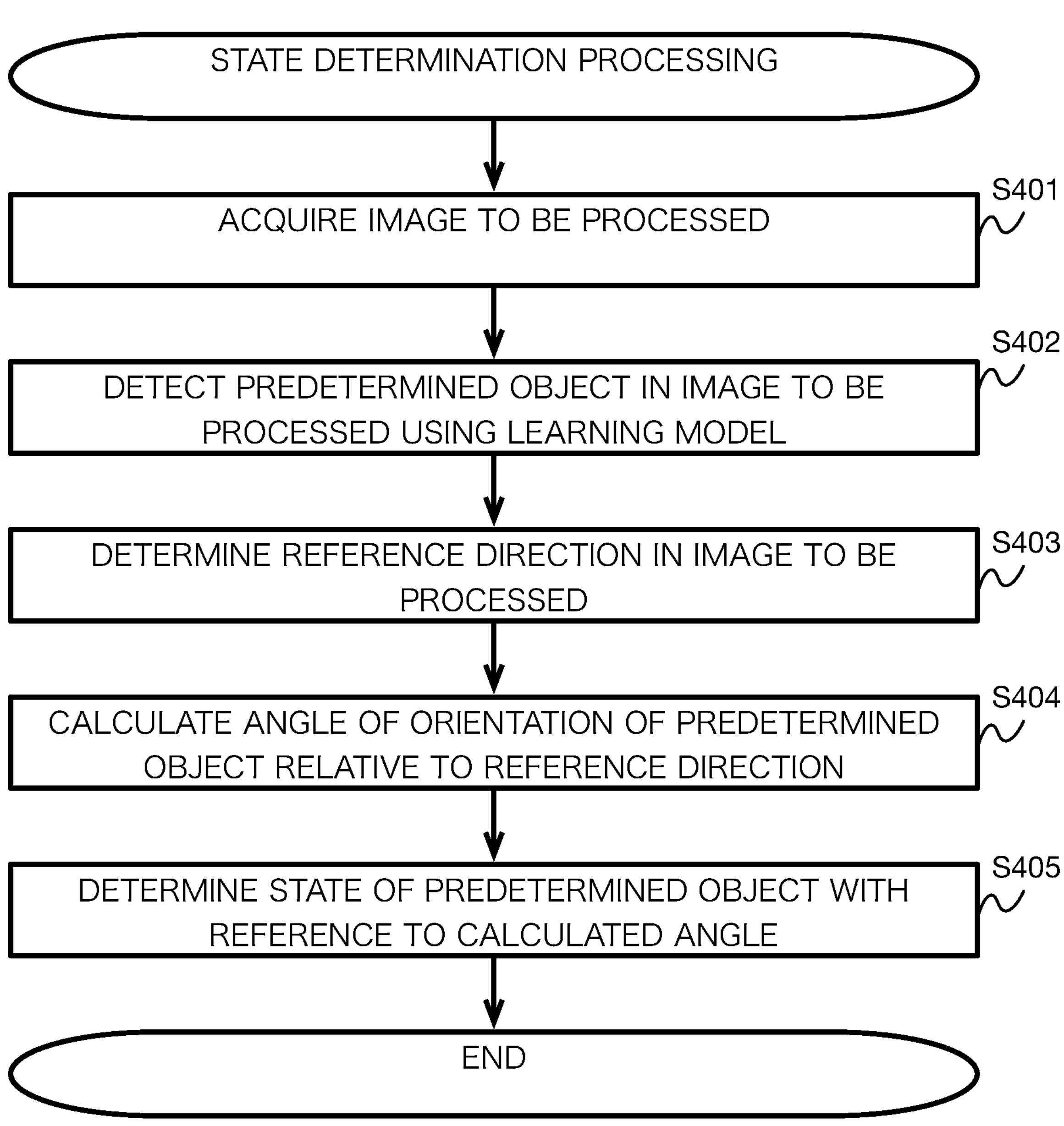
FIG. 11 is a flowchart showing the flow of state determination processing according to the embodiment.

FIG. 11 is a flowchart showing the flow of the state determination processing according to the present embodiment. The processing shown in this flowchart is performed when image data of an image to be processed is prepared and instructions to perform a state determination are provided by a user.

A user captures an image of an antenna device of a base station using the imaging device 81 of the drone 8 that is in flight and inputs image data of an obtained image to be processed to the information processing apparatus 1. On this occasion, the user may perform photographing so that a plurality of antenna devices are included in one image to be processed. When a plurality of antenna devices are included in one image to be processed, the state determination processing is performed for each of the regions of the antenna devices included in the image to be processed. An imaging method and a method for inputting image data to the information processing apparatus 1 are not limited. However, in the present embodiment, an image of an antenna device installed on a structure is captured using the drone 8 on which the imaging device 81 is mounted, and image data transferred from the imaging device 81 to the user terminal 9 via communication or a recording medium is further transferred to the information processing apparatus 1 via a network, whereby image data of an image to be processed is input to the information processing apparatus 1.

In steps S401 and S402, a predetermined object in an image to be processed is detected using a learning model. The processing object acquisition unit 28 acquires an image to be processed (an image aerially photographed using the imaging device 81 mounted on the drone 8 that is in flight in the present embodiment) (step S401). Then, the object detection unit 29 detects a predetermined object (an antenna device in the present embodiment) in the image to be processed acquired in step S401 using a learning model generated by the machine learning processing described with reference to FIG. 10 (step S402). After that, the processing proceeds to step S403.

In steps S403 and S404, the tilt of a detected object is calculated. The angle calculation unit 30 calculates the angle of the object detected in step S402 relative to a predetermined reference in the image to be processed.

Figure 12:
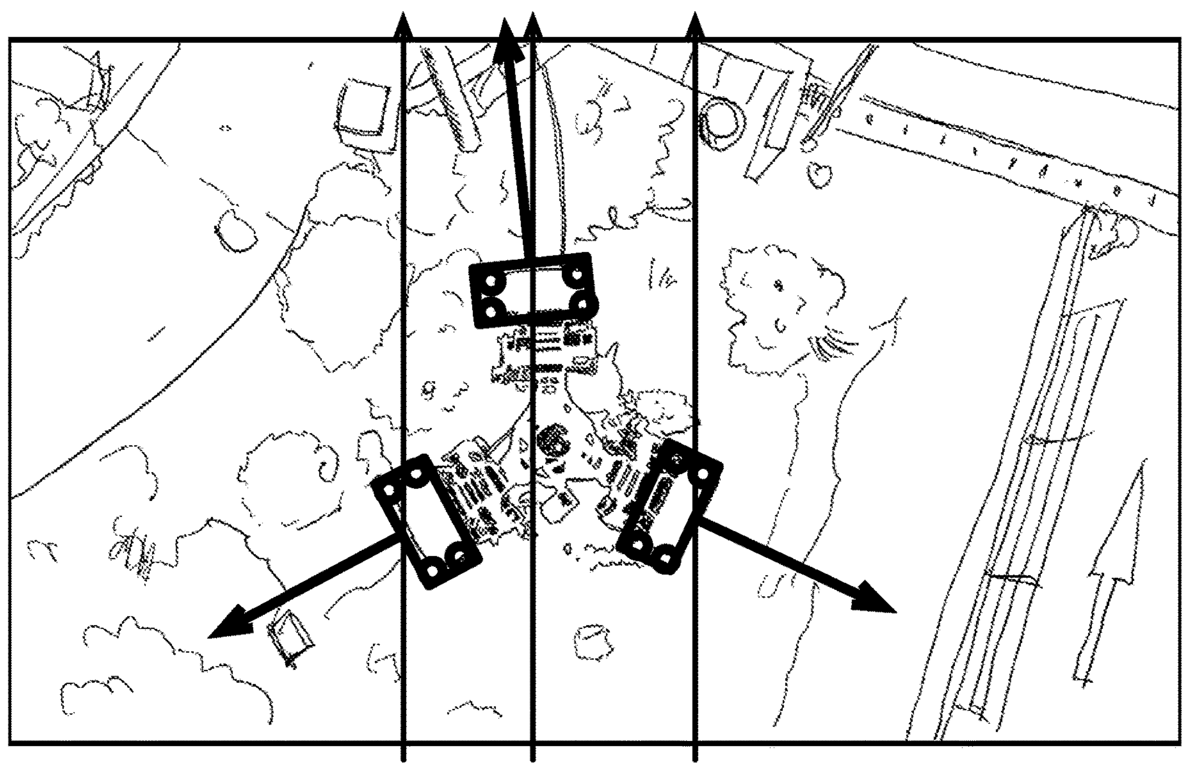
FIG. 12 is a diagram showing the outline of calculating an azimuth angle in a top view image to be processed in the embodiment.

FIG. 12 is a diagram showing the outline of calculating an azimuth angle in a top view image to be processed in the present embodiment. FIG. 12 shows the outline of a case in which the angle calculation unit 30 calculates the angle of the orientation of an antenna device (a predetermined object) detected from an image to be processed relative to a north direction (that may be a true north or a magnetic north) representing a predetermined reference. First, the angle calculation unit 30 determines a reference direction (here, a north direction) in an image to be processed (step S403). In the present embodiment, it is assumed that an image to be processed has been subjected to image correction in advance so as to make its immediately upward direction be a north direction and the immediately upward direction of the image is determined as a reference direction. However, a reference direction may be determined according to other methods. For example, when an image to be processed is not an image that has been subjected to image correction so as to make its immediate upward direction be a north direction, a method for referring to meta data (accelerations of respective axes, angular velocities of respective axes, positional information, compass direction, or the like) added to the image to be processed or a method for comparing the image to be processed with a map image may be employed to specify a north direction in an image and determine the north direction as a reference direction. Further, a direction other than a north direction may be employed as a reference direction. For example, the design-correct installation direction of a predetermined object (an antenna device in the present embodiment), the vertical direction, the horizontal direction, or the like may be employed as a reference direction.

Then, the angle calculation unit 30 determines the orientation of the detected antenna device (predetermined object) (step S404). Here, a method for determining the orientation of a predetermined object by the angle calculation unit 30 is not limited. However, for example, a method for estimating the orientation of an object by applying a box boundary having orientation to the object detected using a machine learning model (see NPL 1), a method for determining the front direction of a detected antenna device by reading a combination of the shape of the antenna device and the front direction of the antenna device in the shape, that are defined in advance, and applying the combination to the contour of the detected antenna device, or the like may be employed. Then, the angle calculation unit 30 calculates an angle formed by the determined reference direction and the determined front direction of the antenna device. In an example shown in FIG. 12, an angle formed by a reference direction shown by a thin line with an arrow and the front direction of an antenna device shown by a thick line with an arrow is calculated. Further, as described above, the design-correct installation direction of a predetermined object, the vertical direction, the horizontal direction, or the like may be employed as a reference direction, besides a compass direction.

Figure 13:
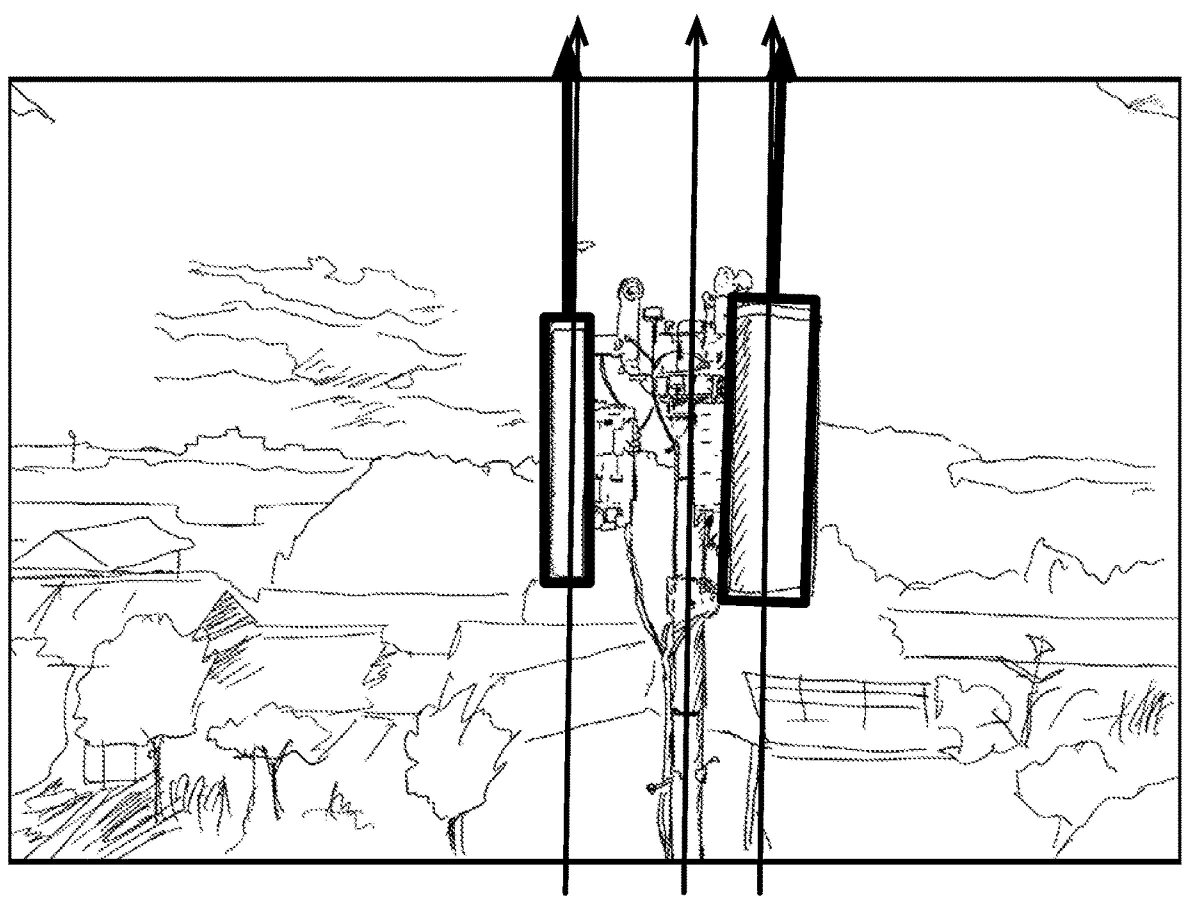
FIG. 13 is a diagram showing the outline of calculating the tilt in a side view image to be processed in the embodiment.

FIG. 13 is a diagram showing the outline of calculating the tilt in a side view image to be processed in the present embodiment. FIG. 13 shows the outline of a case in which the angle calculation unit 30 calculates the angle of the tilt of an antenna device (predetermined object) detected from an image to be processed relative to a vertical direction representing a predetermined reference. First, the angle calculation unit 30 determines a reference direction (here, a vertical direction) in an image to be processed (step S403). In the present embodiment, it is assumed that a center pole in the image is correctly installed in a vertical direction and the longitudinal direction of the center pole is determined as a reference direction. However, a reference direction may be determined according to other methods. For example, a method for referring to meta data (accelerations of respective axes, angular velocities of respective axes, or the like) added to the image to be processed may be employed to specify a vertical direction in the image and determine the vertical direction as a reference direction. In this manner, the angle calculation unit 30 can calculate the azimuth angle, the tilt, or the like of a prescribe object. After that, the processing proceeds to step S405.

In step S405, the state of a predetermined object is determined. In the present embodiment, the information processing apparatus 1 determines, by determining whether the angle calculated in step S404 falls within a previously-set predetermined range, whether the installation state of the antenna device is in a proper state. After that, the processing shown in this flowchart ends, and a determination result is output to the user.

According to the above state determination processing, it is possible to obtain the angle of a predetermined object relative to a reference direction and determine the state of the predetermined object (the installation state of an antenna device in the present embodiment) with reference to the obtained angle.

Figure 14:
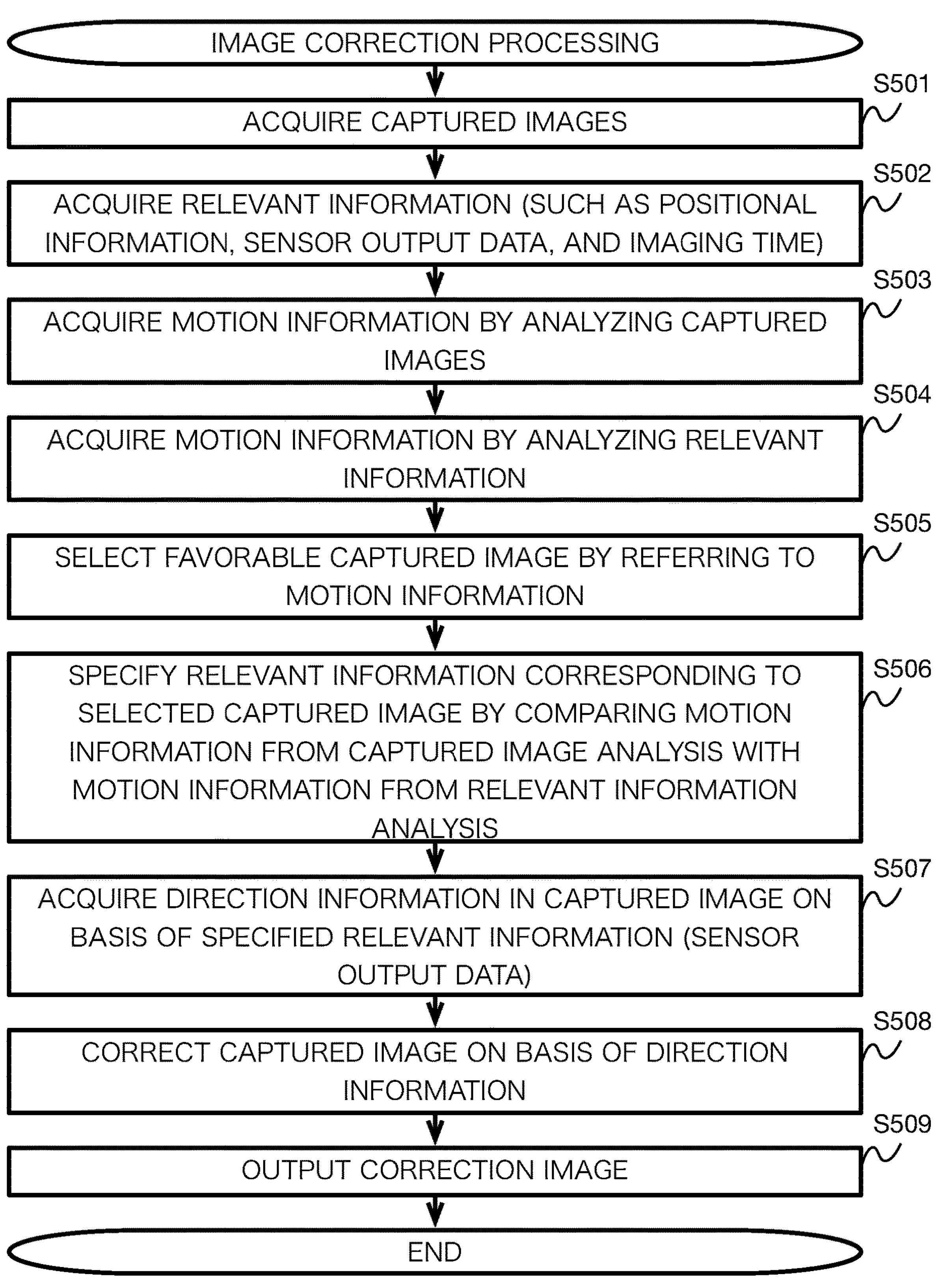
FIG. 14 is a flowchart showing the flow of image correction processing according to the embodiment.

FIG. 14 is a flowchart showing the flow of the image correction processing according to the present embodiment. The processing shown in this flowchart is performed when a captured image captured during flight by the imaging device 81 mounted on the drone 8 is input to the information processing apparatus 1. The processing shown in this flowchart may be performed as preparation for the image data of a processing object image input in the state determination processing described above with reference to FIG. 11.

In steps S501 and S502, captured images and relevant information are acquired. When captured images are acquired by the captured image acquisition unit 31 (step S501), the relevant information acquisition unit 32 acquires, as relevant information, positional information from a GPS mounted on the drone 8 or the imaging device 81, sensor output data from various sensors, and time information, or the like (step S502). Here, a method for acquiring relevant information is not limited, and relevant information may be acquired from meta data (an EXIF or the like) added to captured image data or may be acquired from the flight logs of the drone 8. Further, sensor output data may be raw data or may be processed data based on sensor output. After that, the processing proceeds to step S503.

In steps S503 and S504, motion information during imaging is acquired. The data analysis unit 33 acquires motion information of the drone 8 or the imaging device 81 by analyzing the captured images acquired in step S501 (step S503), and acquires motion information of the drone 8 or the imaging device 81 by analyzing the relevant information (the positional information, the sensor output data and time information, or the like) acquired in step S502 (step S504). After that, the processing proceeds to step S505.

In steps S505 and S506, an image captured in a favorable condition is selected, and sensor output data corresponding to the image is specified. The captured image selection unit 34 selects, by referring to the motion information acquired in step S503 from the analysis of the captured images, a captured image captured in a state close to a stationery state (step S505). Then, the relevant information specification unit 35 links the captured image and the relevant information to each other by comparing the motion information (motion information based on the captured images) acquired in step S503 with the motion information (motion information based on the relevant information) acquired in step S504, and specifies relevant information (sensor output data) corresponding to the captured image selected in step S505 (step S506). After that, the processing proceeds to step S507.

In steps S507 to S509, a captured image is corrected. The direction information acquisition unit 36 acquires, on the basis of the relevant information (sensor output data) specified in step S506, direction information (a compass direction and/or a vertical direction) in the captured image selected in step S505 (step S507). Then, the image correction unit 37 acquires, by correcting the captured image selected in step S505 on the basis of the direction information acquired in step S507, a correction image in which an upward direction in a state where the image is erected and a reference direction (a north or a vertical direction in the present embodiment) in the image are matched to each other (step S508). The information processing apparatus 1 outputs the acquired correction image (step S509), and the processing shown in this flowchart ends.

Variations

The above embodiment describes an example in which the annotation correction processing, the data expansion processing, the machine learning processing, the state determination processing, and the image correction processing are performed by one information processing apparatus. However, each of these processing may be separated and performed by a separate information processing apparatus. Further, on this occasion, some of the annotation image acquisition unit 21, the region specification unit 22, the edge detection unit 23, the estimation unit 24, the annotation correction unit 25, the adjustment image generation unit 26, the machine learning unit 27, the processing object acquisition unit 28, the object detection unit 29, the angle calculation unit 30, the captured image acquisition unit 31, the relevant information acquisition unit 32, the data analysis unit 33, the captured image selection unit 34, the relevant information specification unit 35, the direction information acquisition unit 36, and the image correction unit 37 provided in the information processing apparatus 1 may be omitted.

Figure 15:
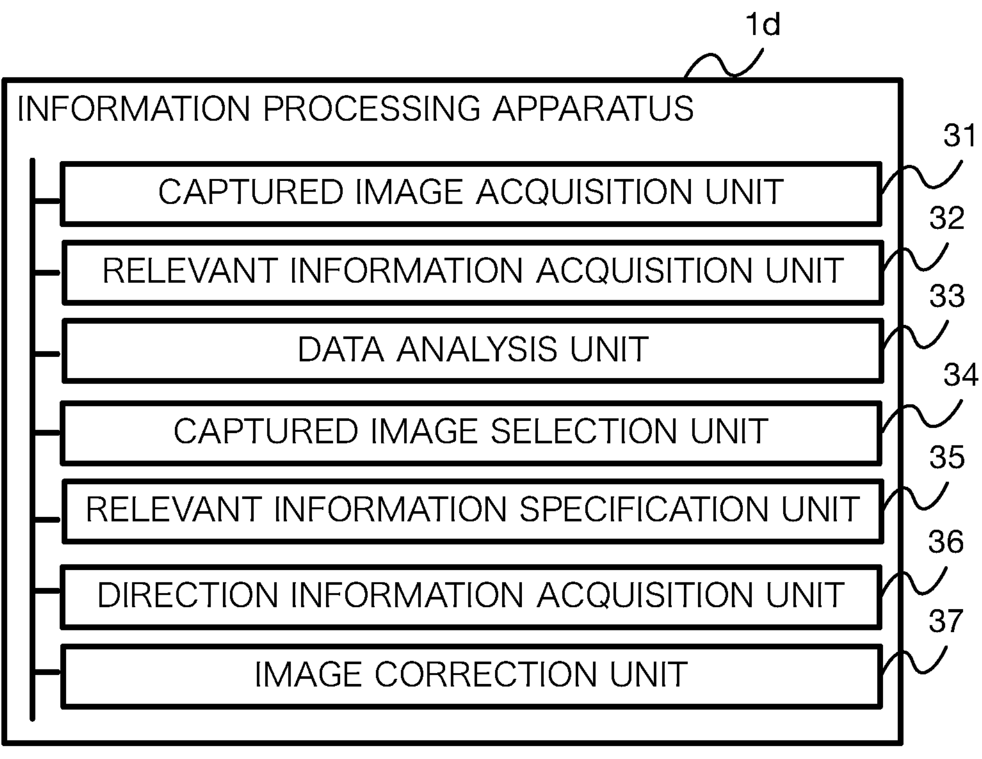
FIG. 15 is a diagram showing the outline of the functional configuration of an information processing apparatus according to a variation.

FIG. 15 is a diagram showing the outline of the functional configuration of an information processing apparatus 1*d* according to a variation. The information processing apparatus 1*d* functions as an information processing apparatus including a captured image acquisition unit 31, a relevant information acquisition unit 32, a data analysis unit 33, a captured image selection unit 34, a relevant information specification unit 35, a direction information acquisition unit 36, and an image correction unit 37. Since respective functions provided in the information processing apparatus 1*c* are substantially the same as those of the above embodiment except that the annotation image acquisition unit 21, the region specification unit 22, the edge detection unit 23, the estimation unit 24, the annotation correction unit 25, the adjustment image generation unit 26, the machine learning unit 27, the processing object acquisition unit 28, the object detection unit 29, and the angle calculation unit 30 are omitted, their descriptions will be omitted.

Further, the above embodiment describes an example in which a captured image is corrected on the basis of direction information in the captured image. However, a captured image may be corrected on the basis of a satellite image.

Figure 16:
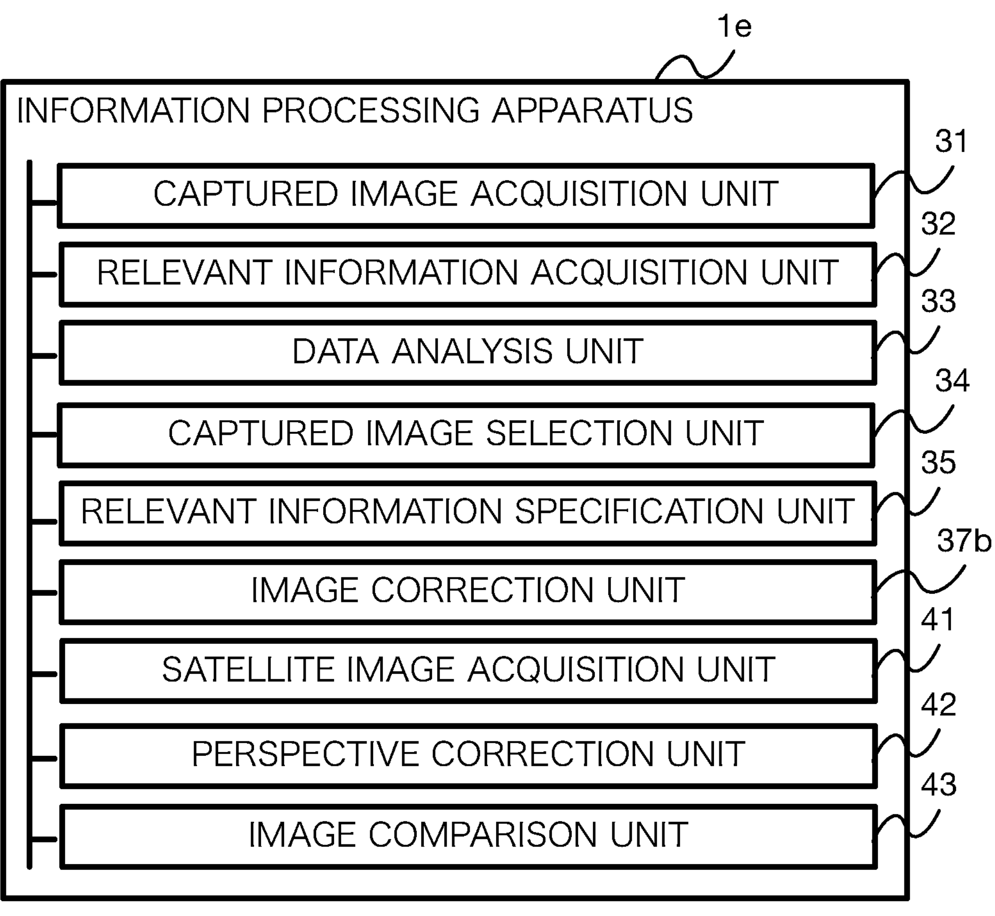
FIG. 16 is a diagram showing the outline of the functional configuration of an information processing apparatus according to a variation.

FIG. 16 is a diagram showing the functional configuration of an information processing apparatus 1*e* according to a variation. The information processing apparatus 1*e* functions as an information processing apparatus including a captured image acquisition unit 31, a relevant information acquisition unit 32, a data analysis unit 33, a captured image selection unit 34, a relevant information specification unit 35, an image correction unit 37*b*, a satellite image acquisition unit 41, a perspective correction unit 42, and an image comparison unit 43. Since the functions of the captured image acquisition unit 31, the relevant information acquisition unit 32, the data analysis unit 33, the captured image selection unit 34, and the relevant information specification unit 35 among functions provided in the information processing apparatus 1*e* are substantially the same as those of the above embodiment, their descriptions will be omitted. However, when annotation correction processing, data expansion processing, machine learning processing, and state determination processing are performed in one information processing apparatus, function units (see FIG. 2) for these processing may be further provided (not shown). Further, when processing to select a favorable captured image is omitted, the data analysis unit 33, the captured image selection unit 34, and the relevant information specification unit 35 may be omitted. When processing to correct a perspective is omitted, the perspective correction unit 42 may be omitted.

The satellite image acquisition unit 41 acquires, on the basis of positional information acquired as relevant information by the relevant information acquisition unit 32, a satellite image corresponding to a captured image. Here, a satellite image may be acquired by the specification of positional information (such as a latitude and a longitude) from a map information service, a satellite image library, or the like open to the public on the Internet or in a private network.

The perspective correction unit 42 corrects a satellite image and/or a captured image so that the perspectives of the satellite image and the captured image are matched or approximated to each other. However, a satellite image is captured at an extremely large zoom value and can be roughly regarded as a parallel projection (orthogonal projection) image. Therefore, an embodiment shown in this variation will describe an example in which the perspective of a captured image is corrected so that the captured image is parallel projected (orthogonal projected) or approximate to a parallel projection to make the perspectives of a satellite image and the captured image matched or approximated to each other. For example, the perspective correction unit 42 can estimate a distance from an imaging point to an imaging object related to a captured image and correct the captured image on the basis of the estimated distance. In estimating a distance, altitude information included in sensor output data or information on a distance to an object may be used (for example, altitude information or distance information is acquirable as relevant information when the drone 8 or the imaging device 81 has an altimeter, a laser range finder, or the like mounted thereon), or a previously-prepared machine learning model for distance estimation may be used. Further, for example, by estimating or measuring the three-dimensional shape of a captured object in a captured image and redrawing the captured image as a parallel projection image or a telescopic image having a large zoom magnification on the basis of the estimated or measured three-dimensional shape, the perspective correction unit 42 can correct the captured image. For example, when the drone 8 or the imaging device 81 has a three-dimensionally-shaped scanner or the like such as a LIDAR mounted thereon, three-dimensional shape information is acquirable as relevant information. However, a shape estimated here is not necessarily a perfect shape. In estimating a three-dimensional shape, a previously-prepared machine learning model for three-dimensional shape estimation may be used.

The image comparison unit 43 detects, by detecting and comparing a characteristic in a satellite image and a characteristic in a captured image with each other, a corresponding characteristic captured in both the satellite image and the captured image. More specifically, the image comparison unit 43 detects, as a corresponding characteristic between a satellite image and a captured image, a structure (such as a road) that relatively hardly changes even with the lapse of a long time. Such a structure suitable for comparison may be detected using a previously-prepared machine learning model. Note that vegetation, vehicles, or the like are highly likely to change with the lapse of a time and therefore may be low in priority as a candidate for a corresponding characteristic. For example, the image comparison unit 43 can perform edge detection on both a satellite image and a captured image to calculate the characteristic amounts of detected edges and detect a corresponding characteristic according to a method such as comparing the calculated characteristic amounts with each other. However, another method such as machine learning may be employed as a method for detecting a corresponding characteristic between two images.

Further, the image comparison unit 43 detects, using a satellite image and/or a captured image after correction by the perspective correction unit 42, a corresponding characteristic in the present embodiment. However, when perspective correction is omitted, a captured image acquired by the captured image acquisition unit 31 is used as it is.

The image correction unit 37*b* acquires, by correcting a captured image so that a position of a corresponding characteristic in an image is matched or approximated to a position of the corresponding characteristic in a satellite image, a correction image in which a predetermined direction in a state where the image is erected and a reference direction in the image are matched to each other. Here, a specific correction method includes, for example, the rotation of an image. However, a specific method for correcting an image is not limited like the above embodiment.

Figure 17:
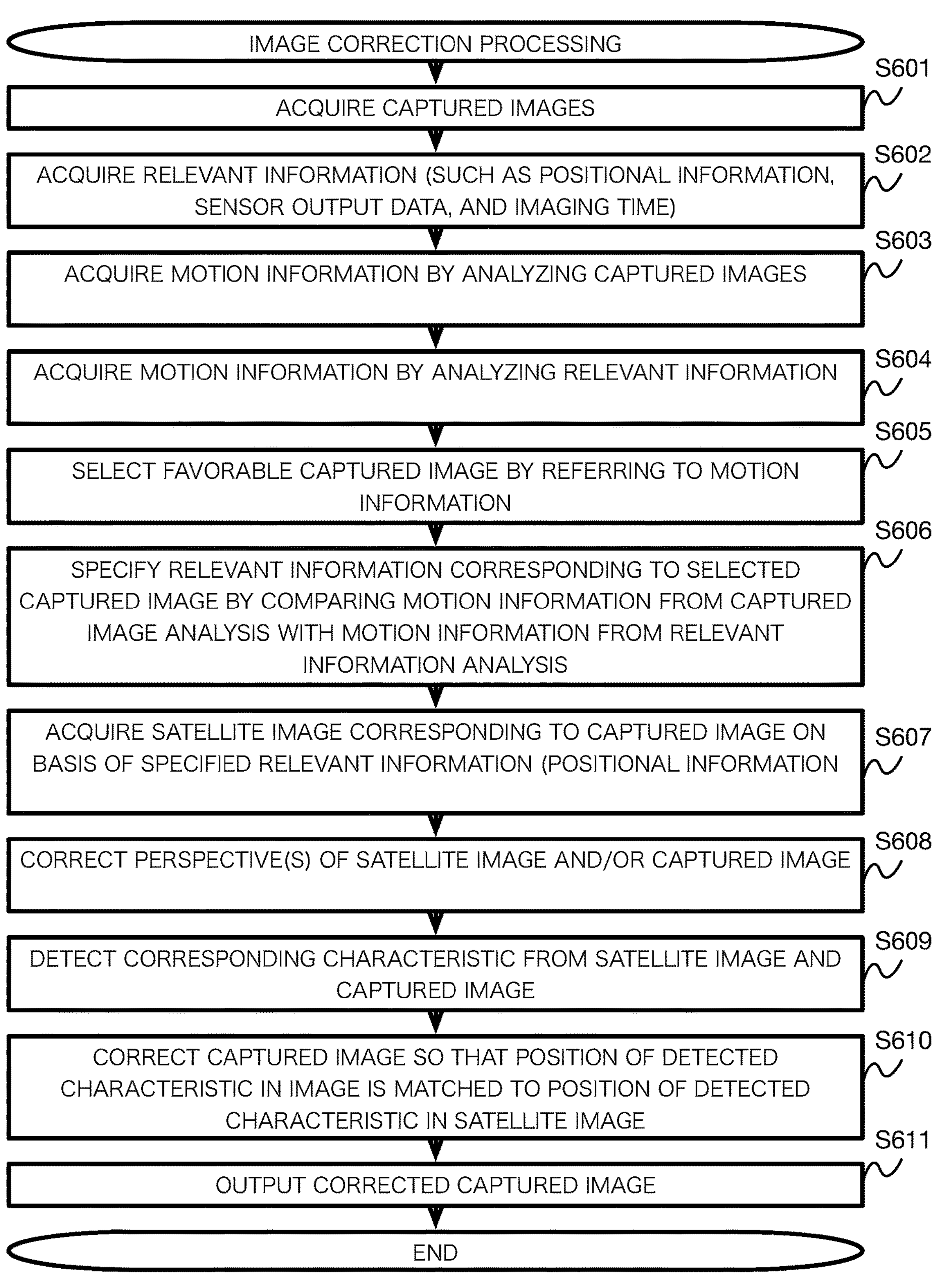
FIG. 17 is a flowchart showing the flow of image correction processing according to a variation.

FIG. 17 is a flowchart showing the flow of the image correction processing according to a variation. The processing shown in this flowchart is performed when a captured image captured during flight by the imaging device 81 mounted on the drone 8 is input to the information processing apparatus 1. The processing shown in this flowchart may be performed as preparation for the image data of a processing object image input in the state determination processing described above with reference to FIG. 11.

In steps S601 and S602, captured images and relevant information are acquired. When captured images are acquired by the captured image acquisition unit 31 (step S601), the relevant information acquisition unit 32 acquires, as relevant information, positional information from a GPS mounted on the drone 8 or the imaging device 81, sensor output data from various sensors and time information, or the like (step S602). Here, a method for acquiring relevant information is not limited, and relevant information may be acquired from meta data (an EXIF or the like) added to captured image data or may be acquired from the flight logs of the drone 8. Further, sensor output data may be raw data or may be processed data based on sensor output. After that, the processing proceeds to step S603. However, as described above, in this variation, the data analysis unit 33, the captured image selection unit 34, and the relevant information specification unit 35 may be omitted. In this case, the processing of steps S603 to S606 that will be described below is omitted, and the processing proceeds to step S607.

In steps S603 and S604, motion information during imaging is acquired. The data analysis unit 33 acquires motion information of the drone 8 or the imaging device 81 by analyzing the captured images acquired in step S601 (step S603), and acquires motion information of the drone 8 or the imaging device 81 by analyzing the relevant information acquired in step S602 (step S604). After that, the processing proceeds to step S605.

In steps S605 and S606, an image captured in a favorable condition is selected, and positional information corresponding to the image is specified. The captured image selection unit 34 selects, by referring to the motion information acquired in step S603 from the analysis of the captured images, a captured image captured in a state close to a stationery state (step S605). Then, the relevant information specification unit 35 links the captured image and the relevant information to each other by comparing the motion information (motion information based on the captured images) acquired in step S603 with the motion information (motion information based on the relevant information) acquired in step S604, and specifies relevant information (positional information) corresponding to the captured image selected in step S605 (step S606). After that, the processing proceeds to step S607.

In step S607, a satellite image is acquired. The satellite image acquisition unit 41 acquires, on the basis of the relevant information (positional information) specified in step S606, a satellite image corresponding to the captured image (step S607). After that, the processing proceeds to step S608. However, the perspective correction unit 42 may be omitted in this variation as described above. In this case, the processing of step S608 that will be described below is omitted, and the processing proceeds to step S609.

In step S608, the perspective of an image is corrected. The perspective correction unit 42 corrects the satellite image and/or the captured image so that the perspectives of the satellite image and the captured image are matched or approximated to each other. Since a conventional method may be used according to information (such as a distance and/or a three-dimensional shape) used to correct a perspective for the specific content of image processing to correct the perspectives, the description will be omitted. Note that the correction of a perspective may be omitted as described above. After that, the processing proceeds to step S609.

In steps S609 to S611, a captured image is corrected on the basis of a satellite image. The image comparison unit 43 detects, by detecting and comparing a characteristic in the satellite image acquired in step S607 and a characteristic in the captured image acquired in step S601 with each other, a corresponding characteristic captured in both the satellite image and the captured image (step S609). Note that images used here may be those of which the perspectives have been corrected in step S608. When the corresponding characteristic is detected, the image correction unit 37*b* acquires, by correcting (such as rotating) the captured image so that a position of the corresponding characteristic detected in step S609 in the image is matched or approximated to a position of the corresponding characteristic in the satellite image, a correction image in which a predetermined direction in a state where the image is erected and a reference direction (a north in the present embodiment) in the image are matched to each other (step S610). The information processing apparatus 1 outputs the acquired correction image (corrected captured image) (step S611), and the processing shown in this flowchart ends.

Further the above embodiment describes an example in which aerial photographing is performed using the drone 8. However, other devices (such as an airplane) may be used for aerial photographing.

REFERENCE SIGNS LIST

1 Information processing apparatus

The invention claimed is:

1. An information processing system comprising:

at least one memory configured to store program code;

at least one processor configured to operate as instructed by the program code, the program code including:

captured image acquisition code configured to cause at least one of the at least one processor to acquire a captured image captured during flight by an imaging device mounted on an airplane;

flight information acquisition code configured to cause at least one of the at least one processor to acquire flight information detected using a sensor mounted on the airplane;

data analysis code configured to cause at least one of the at least one processor to acquire motion information in a time series of the airplane or the imaging device by analyzing a plurality of the captured images continuously captured in a time series and the flight information continuously acquired in a time series;

flight information specification code configured to cause at least one of the at least one processor to specify the flight information acquired simultaneously with or nearly simultaneously with the captured image by matching motion information acquired by analyzing the captured images and motion information acquired by analyzing the flight information to each other;

image correction code configured to cause at least one of the at least one processor to acquire, by correcting the captured image on a basis of information acquired using the flight information, a correction image in which a predetermined direction in a state where the image is erected and a reference direction in the image are matched to each other; and direction information acquisition code configured to cause at least one of the at least one processor to acquire direction information in the captured image with the earth as a reference, on a basis of information on a posture of the airplane or the imaging device acquired as the flight information, wherein the image correction code is further configured to cause at least one of the at least one processor to acquire, by correcting the captured image on a basis of the direction information, the correction image in which the predetermined direction in the state where the image is erected and the reference direction in the image are matched to each other, wherein the direction information acquisition code is further configured to cause at least one of the at least one processor to acquire the direction information on a basis of the flight information acquired simultaneously with or nearly simultaneously with the captured image, wherein the direction information acquisition code is further configured to cause at least one of the at least one processor to acquire the direction information on a basis of specified flight information, wherein the flight information specification code is further configured to cause at least one of the at least one processor to specify the flight information acquired simultaneously with or nearly simultaneously with the captured image by interpolating, based on a machine learning model or a statistical model trained using previously acquired flight information, a first sequence of a parameter included in motion information acquired by analyzing the captured images and a second sequence of the parameter included in motion information acquired by analyzing the flight information, and generating a sequence alignment representing correspondence between the sequences by comparing the interpolated first sequence and the second sequence, and performing matching based on the generated sequence alignment.

2. The information processing system according to claim 1, wherein the image correction code is further configured to cause at least one of the at least one processor to acquire, by rotating the captured image on a basis of the direction information, the correction image in which the predetermined direction in the state where the image is erected and a predetermined compass direction in the image are matched to each other.

3. The information processing system according to claim 1, wherein the image correction code is further configured to cause at least one of the at least one processor to acquire, by rotating the captured image on a basis of the direction information, the correction image in which the predetermined direction in the state where the image is erected and a north in the image are matched to each other.

4. The information processing system according to claim 1, wherein the image correction code is further configured to cause at least one of the at least one processor to acquire, by rotating the captured image on a basis of the direction information, the correction image in which the predetermined direction in the state where the image is erected and a vertical direction in the image are matched to each other.

5. The information processing system according to claim 1, wherein the flight information acquisition code is further configured to cause at least one of the at least one processor to acquire, as the flight information, three-dimensional information detected by at least one type of three-axis sensor mounted on the airplane.

6. The information processing system according to claim 1, further comprising:

data analysis code configured to cause at least one of the at least one processor to acquire motion information in a time series of the airplane or the imaging device by analyzing a plurality of the captured images continuously captured in a time series or the flight information continuously acquired in a time series; and captured image selection code configured to cause at least one of the at least one processor to select, on a basis of motion information acquired by the data analysis unit, a captured image in which a state of the imaging device during imaging is close to a stationary state, wherein the image correction code is further configured to cause at least one of the at least one processor to acquire the correction image by correcting the selected captured image.

7. The information processing system according to claim 1, further comprising:

satellite image acquisition code configured to cause at least one of the at least one processor to acquire a satellite image corresponding to the captured image on a basis of positional information showing a flight position of the airplane, the positional information being acquired as the flight information; and an image comparison code configured to cause at least one of the at least one processor to detect, by detecting and comparing a characteristic in the satellite image and a characteristic in the captured image with each other, a corresponding characteristic captured in both the satellite image and the captured image, wherein the image correction code is further configured to cause at least one of the at least one processor to acquire, by correcting the captured image so that a position of the corresponding characteristic in the image is matched or approximated to a position of the corresponding characteristic in the satellite image, the correction image in which the predetermined direction in the state where the image is erected and the reference direction in the image are matched to each other.

8. The information processing system according to claim 7, further comprising:

perspective correction code configured to cause at least one of the at least one processor to correct the satellite image and/or the captured image so that perspectives of the satellite image and the captured image are matched or approximated to each other, wherein the image comparison code is further configured to cause at least one of the at least one processor to detect the corresponding characteristic using the satellite image and/or the captured image after correction by the perspective correction unit.

9. The information processing system according to claim 8, wherein the perspective correction code configured to cause at least one of the at least one processor to estimate a distance from an imaging point to an imaging object related to the captured image and correct the satellite image and/or the captured image on a basis of the estimated distance.

10. The information processing system according to claim 8, wherein the perspective correction code is further configured to cause at least one of the at least one processor to estimate a shape of an imaging object in the captured image and corrects the satellite image and/or the captured image on a basis of the estimated shape.

11. An information processing method, performed by at least one processor and comprising:

acquiring a captured image captured during flight by an imaging device mounted on an airplane;

acquiring flight information detected using a sensor mounted on the airplane;

acquiring motion information in a time series of the airplane or the imaging device by analyzing a plurality of the captured images continuously captured in a time series and the flight information continuously acquired in a time series;

specifying the flight information acquired simultaneously with or nearly simultaneously with the captured image by matching motion information acquired by analyzing the captured images and motion information acquired by analyzing the flight information to each other;

acquiring, by correcting the captured image on a basis of information acquired using the flight information, a correction image in which a predetermined direction in a state where the image is erected and a reference direction in the image are matched to each other;

acquiring direction information in the captured image with the earth as a reference, on a basis of information on a posture of the airplane or the imaging device acquired as the flight information;

acquiring, by correcting the captured image on a basis of the direction information, the correction image in which the predetermined direction in the state where the image is erected and the reference direction in the image are matched to each other;

acquiring the direction information on a basis of the flight information acquired simultaneously with or nearly simultaneously with the captured image;

acquiring the direction information on a basis of specified flight information;

specifying the flight information acquired simultaneously with or nearly simultaneously with the captured image by interpolating, based on a machine learning model or a statistical model trained using previously acquired flight information, a first sequence of a parameter included in motion information acquired by analyzing the captured images and a second sequence of the parameter included in motion information acquired by analyzing the flight information;

generating a sequence alignment representing correspondence between the sequences by comparing the interpolated first sequence and the second sequence; and performing matching based on the generated sequence alignment.

12. A non-transitory computer readable medium storing a computer program that when executed by at least one processor, causes the at least one processor to:

acquire a captured image captured during flight by an imaging device mounted on an airplane;

acquire flight information detected using a sensor mounted on the airplane;

acquire motion information in a time series of the airplane or the imaging device by analyzing a plurality of the captured images continuously captured in a time series and the flight information continuously acquired in a time series;

specify the flight information acquired simultaneously with or nearly simultaneously with the captured image by matching motion information acquired by analyzing the captured images and motion information acquired by analyzing the flight information to each other;

acquire, by correcting the captured image on a basis of information acquired using the flight information, a correction image in which a predetermined direction in a state where the image is erected and a reference direction in the image are matched to each other;

acquire direction information in the captured image with the earth as a reference, on a basis of information on a posture of the airplane or the imaging device acquired as the flight information;

acquire, by correcting the captured image on a basis of the direction information, the correction image in which the predetermined direction in the state where the image is erected and the reference direction in the image are matched to each other;

acquire the direction information on a basis of the flight information acquired simultaneously with or nearly simultaneously with the captured image;

acquire the direction information on a basis of specified flight information;

specify the flight information acquired simultaneously with or nearly simultaneously with the captured image by interpolating, based on a machine learning model or a statistical model trained using previously acquired flight information, a first sequence of a parameter included in motion information acquired by analyzing the captured images and a second sequence of the parameter included in motion information acquired by analyzing the flight information;

generate a sequence alignment representing correspondence between the sequences by comparing the interpolated first sequence and the second sequence; and perform matching based on the generated sequence alignment.

* * * * *